United States Patent [19]
Bauer et al.

[11] Patent Number: 5,699,402
[45] Date of Patent: Dec. 16, 1997

[54] METHOD AND APPARATUS FOR FAULT SEGMENTATION IN A TELEPHONE NETWORK

[75] Inventors: Frank R. Bauer, Long Grove; Joseph S. Rosen, Chicago; Kurt E. Schmidt, Lindenhurst; David J. Groessl, Mundelein, all of Ill.

[73] Assignee: Teradyne, Inc., Boston, Mass.

[21] Appl. No.: 311,802

[22] Filed: Sep. 26, 1994

[51] Int. Cl.$^6$ .............................. H04M 3/08; H04M 3/22
[52] U.S. Cl. ............................... 379/26; 379/10; 379/14; 379/15
[58] Field of Search ........................... 379/1–2, 5, 9–10, 379/15, 24–27, 29–31, 14, 22, 23

[56] References Cited

U.S. PATENT DOCUMENTS

| | | | |
|---|---|---|---|
| 4,113,998 | 9/1978 | Ashdown et al. | 179/175.3 |
| 4,139,745 | 2/1979 | Ashown et al. | 379/26 |
| 4,229,626 | 10/1980 | Peoples | 179/175.3 |
| 4,291,204 | 9/1981 | Crick | 379/26 |
| 4,766,594 | 8/1988 | Ogawa | 379/5 |
| 4,852,145 | 7/1989 | Bevers et al. | 379/27 |
| 4,868,507 | 9/1989 | Reed | 379/26 |
| 4,991,105 | 2/1991 | Pimental | 379/26 |
| 4,991,196 | 2/1991 | Krebs | 379/29 |
| 5,054,050 | 10/1991 | Burke | 379/27 |
| 5,073,919 | 12/1991 | Hagensick | 379/30 |
| 5,083,086 | 1/1992 | Steiner | 379/26 |
| 5,121,420 | 6/1992 | Marr | 379/29 |
| 5,224,149 | 6/1993 | Garcia | 379/5 |
| 5,343,461 | 8/1994 | Barton | 379/1 |
| 5,359,646 | 10/1994 | Johnson | 379/26 |
| 5,521,958 | 5/1996 | Selig | 379/27 |

FOREIGN PATENT DOCUMENTS

| | | |
|---|---|---|
| 0 056 545 | 7/1982 | European Pat. Off. . |
| 0 391 312 | 10/1990 | European Pat. Off. . |
| 11 62 427 | 2/1964 | Germany . |
| 180 073A | 3/1987 | United Kingdom . |
| 94 19912 | 9/1994 | United Kingdom . |

OTHER PUBLICATIONS

Proceedings 1982 International Symposium on Subscriber Loops and Services, Sep. 20, 1982–Sep. 24, 1984 Toronto (CA), pp. 152–155. R.H.T. Cartwright '4TEL Automated Subscriber Line Test System'.

Globecom 85 IEEE Global Telecommunications Conference, vol. 3, 2–5 Dec. 1985 New Orleans (US), pp. 1242–1246. C. Augenstein et al. 'Man–Machine Interface for Siemens EWSD'. see p. 1246, left column, line 10–line 13.

NOMS 92–IEEE 1992 Network Operations and Management Symposium, vol. 2, 6 Apr. 1992 Memphis (US), pp. 520–532, XP 000344720, Willis Stinson et al. 'A State–based Approach to Real Time Telecommunications Network Management'.

Discovery, Analysis, and Presentation of Strong Rules, Piatesky–Shapiro, Knowledge Discovery in Databases 1991.

Combining Causal Models and Case–Based Reasoning, Koton, Second Generation Expert Systems 1993.

(List continued on next page.)

Primary Examiner—Curtis Kuntz
Assistant Examiner—Vijay Shankar
Attorney, Agent, or Firm—Richard E. Gamache

[57] ABSTRACT

A line test system for diagnosing and segmenting faults in a switched telephone network. The system includes a remote measurement unit installed at a switch and a test system controller. The test system controller stores data about operating parameters of each of the subscriber lines when they are believed to be free of faults. When a fault is reported, the parameters are measured again. By comparison of the measured parameters with the stored parameters, the fault can be segmented between the premise and the network. Segmentation is performed using knowledge based analysis techniques. The actual source of the fault once it is repaired is also stored by the test system controller. This historical information is used to improve the accuracy of the knowledge based analysis techniques used for segmentation.

21 Claims, 8 Drawing Sheets

OTHER PUBLICATIONS

*Combining Heuristic Reasoning with Causal Reasoning in Diagnostic Problem Solving,* Console, et al., Second Generation Expert Systems 1993.

*Multiple Models for Emergency Planning,* Paillet, Second Generation Expert Systems 1993.

*A Hybrid Knowledge–Based System for Technical Diagnosis Learning and Assistance,* Macchion, et al., Topics in Case–Based Reasoning 1994.

*Tuning Rules by Cases,* Nakatani, et al., Topics in Case–Based Reasoning 1994.

*Expert Systems for Telecommunications Dispatch Analysis and Remote Trouble Resolution,* Prerau, Worldwide Intelligent Systems: Approaches to Telecommunications and Network Management 1995.

*The Use of Hybrid Intelligent Systems in Telecommunications,* Vermesan, et al., Worldwide Intelligen t Systems: Approaches to Telecommunications and Network Management 1995.

*Outside Plant Cable Testing Seminar* (view graphs of Tektronix seminar).

*MIRABEL Subscriber Line Testing And Measurement* (product literature by CNET).

*NYNEX MAX* (product literature).

*Intelligent TDRs Score High On T–1 Tests,* David P. Haas; Telephony, Sep. 16, 1991.

*Time Domain Reflectometry: Versatile New Way of Testing Cable,* John Trudel, Telephony Jan. 19, 1976.

*Deregulation And CPE Maintenance; What Happens If . . . ,* Blakeslee et al., Telephone Engineer & Management, Jan. 15, 1983.

FIG. 4A

HISTORICAL FAILURE DATA

| RULES TRIGGERED | DISPATCH | CLOSE OUT | CONFIG. DATA | DC MODEL | AC MODEL | PARAMETER VALUES | PREMISIS EQUIP. | TIME STAMP |
|---|---|---|---|---|---|---|---|---|
| RULES TRIGGERED | DISPATCH | CLOSE OUT | CONFIG. DATA | DC MODEL | AC MODEL | PARAMETER VALUES | PREMISIS EQUIP. | TIME STAMP |
| ... | | | | | | | | |
| RULES TRIGGERED | DISPATCH | CLOSE OUT | CONFIG. DATA | DC MODEL | AC MODEL | PARAMETER VALUES | PREMISIS EQUIP. | TIME STAMP |

FIG. 4B

FOOT PRINT DATA BASE

| EQUIPMENT NUMBER | DIRECTORY NUMBER | | CONFIG. DATA | DC MODEL | AC MODEL | PARAMETER VALUES | PREMISIS EQUIP. | TIME STAMP |
|---|---|---|---|---|---|---|---|---|
| EQUIPMENT NUMBER | DIRECTORY NUMBER | | CONFIG. DATA | DC MODEL | AC MODEL | PARAMETER VALUES | PREMISIS EQUIP. | TIME STAMP |
| ... | | | | | | | | |
| EQUIPMENT NUMBER | DIRECTORY NUMBER | | CONFIG. DATA | DC MODEL | AC MODEL | PARAMETER VALUES | | TIME STAMP |

| EQUIPMENT NUMBER | CABLE NUMBER | DIRECTORY NUMBER | SWITCH CONNECT. | CABLE CONNECT. | INSTALL PARAM. | C.O. LIMITS |
|---|---|---|---|---|---|---|
| EQUIPMENT NUMBER | CABLE NUMBER | DIRECTORY NUMBER | SWITCH CONNECT. | CABLE CONNECT. | INSTALL PARAM. | C.O. LIMITS |
| ... | ... | ... | ... | ... | ... | ... |
| EQUIPMENT NUMBER | CABLE NUMBER | DIRECTORY NUMBER | SWITCH CONNECT. | CABLE CONNECT. | INSTALL PARAM. | C.O. LIMITS |

CABLE DATABASE

FIG. 4C

METHOD AND APPARATUS FOR FAULT SEGMENTATION IN A TELEPHONE NETWORK

This invention relates generally to telephone networks and more specifically to a method of locating a fault in the network.

Telephone networks contain at least one pair of wires which connects each subscriber to the network, called a "subscriber line". Traditionally, all of the pairs of wires in one geographic region run to a central office. The central office, sometimes called a class 5 office, contains electronic circuitry which is called a "switch."

The switch is also connected to trunk telephone lines, which run to other telephone company switches in the network. To complete a call, the switch in the central office connected to the subscriber placing the call connects the pair of wires running to the subscriber to a trunk line. Through the telephone network, that trunk line is connected to a switch in the central office near the party receiving the call. The switch in the receiving office connects that trunk line to the pair of wires which runs to the subscriber who is to receive the call.

In this way, the trunk lines of the network can be switched to carry calls from different subscribers at different times. Great efficiencies can be achieved by routing telephone calls over trunk lines in the network. Also, the network usually contains more trunk lines than are needed at any given time. If one trunk line is faulty, calls can be rerouted through other trunk lines in the network until the faulty line is fixed.

Nonetheless, at some point, there must still be a pair of telephone wires connecting each subscriber to a switch. As these pairs of wires are dedicated for use by that subscriber, if there is a fault in that pair, the subscriber loses telephone service or receives degraded service. Thus, it is very important for telephone companies to keep these lines in good repair. If faults occur in these subscriber lines, the telephone company needs to repair them as quickly as possible. Quick repair is, unfortunately, very difficult because of the large amount, in linear feet, of subscriber lines. A local telephone company might have millions of telephone subscribers, each on average several miles from the central office. As a result, there are millions of linear feet of subscriber lines. When a fault occurs, before it can be repaired, it must first be located within this millions of feet of wires.

To deal with this problem, most telephone companies use automated test equipment to help identify faults. One example of such test equipment is the 4TEL® product sold by Teradyne, Inc. of Deerfield, Ill., U.S.A. The 4TEL® product includes a test and measurement unit (TMU) installed in the central office and is connected to the switch. The TMU can access individual subscriber lines through the switch. The TMU contains several measurement devices which it uses to measure various parameters of the subscriber line.

The measured line parameters are sent to a test system controller (TSC), which is usually located at the telephone company service center. The TSC is, in essence, a computer which has been programmed to analyze the parameters measured for each line and to control which lines are measured at which time. The TSC compares the measured parameters for each line to values which would be expected for a good line. If the measured values are outside of the acceptable range, a fault is detected.

When a fault is detected, the telephone company dispatches a repair person to find and fix the fault. Historically, telephone companies have employed three types of repair people: those who repair faults in the central office; those who repair faults in cables routing the pairs of subscriber lines around the telephone company's service area; and those repairing faults at the "station." The station refers to the subscriber line as it leaves the cable and runs into the customer's premises. The different types of repair people carry different types of equipment and have different types of training geared towards the types of conditions they are likely to encounter. For example, a repair person dispatched to repair a cable might carry a time domain reflectometry (TDR) unit. This unit is connected to a telephone line and transmits an electrical pulse down the line. When the pulse reaches an open circuit or a short circuit fault, it is reflected back towards the TDR unit. By measuring the time it takes for the pulse to travel back and forth to the fault, the distance between the fault and repair person can be computed. In this way, faults can be located to within a section of cable. However, such a device would not likely be needed by a repair person repairing faults within the central office.

To facilitate dispatch of the appropriate personnel, current automatic telephone line test equipment reports whether the fault is most likely in the central office, the cable or the station. This segmentation of faults is performed by observing which of the measured parameters of the line deviated from the expected values. Historically, faults in different locations often produce parameters in different ranges.

However, merely segmenting faults into one of three locations is not sufficient. Specifically, the station includes wires which are owned by the telephone company and wires which are owned by the subscriber. The telephone company owns and is responsible for repairing the "drop." The drop is the connection from the cable to the subscriber's premises. The subscriber owns and is responsible for repairing the wires inside the subscriber's premises. The drop is usually separated from the premises wiring by a network interface unit, which is mounted on the side of the customer premises.

When the telephone company dispatches a repair person to repair a fault at the station, they can not be sure if the fault will be the telephone company's responsibility to repair or that of the subscriber. When the fault is eventually determined to be in the premises wiring, the fault might not be repaired because the repair person has no access to the premises. Additionally, there are issues of allocating the costs of the service call. When the fault is within the premises, the telephone company is entitled to charge the subscriber for the service, if the subscriber has agreed in advance to pay for it. To get advance agreement from the subscriber, though, requires that the telephone company first make a service call to determine whether the fault is in the premises wiring, which is costly to the telephone company. Alternatively, the telephone company must advise the subscriber that there might be a charge for service based on what the repair person finds. Many subscribers object to being informed in this fashion that they might be held responsible for charges.

As a result, there has been a great interest in developing a way to identify whether a station fault is in the drop or within the customer premises. One widely considered solution is the use of Remote Isolation Devices (RID). The RID is a remotely controlled switch which is installed at the interface between the premises wiring and the drop. When it receives a command from the automatic line test system, it disconnects the premises wiring from the drop. The automatic line tester retests the line with the premises wiring disconnected. If the fault persists, it can be localized to the drop, or at least excluded from being within the premises wiring.

Because each subscriber line must include its own RID, each telephone company would have to buy between tens of thousands and millions of RIDs. Significant efforts have been expended designing low cost RIDs. However, even with RIDs that cost as little as a few dollars, the cost of outfitting all subscriber lines is still very large. A service call must be made to each subscriber premises to install the units. Moreover, existing line test equipment would have to be modified to operate in conjunction with the RIDs. Only a few telephone companies have committed to this expenditure. As a result, there still remains a significant need to be able to segment faults on subscriber lines, at least to the level that the telephone company can know with high confidence whether the fault is in the premises wiring before a repair person is dispatched.

SUMMARY OF THE INVENTION

With the foregoing background in mind, it is an object of this invention to provide a method and apparatus to determine the location of telephone line faults.

It is also an object to distinguish between station faults in the subscriber premises and in the drop.

It is yet another object to provide automatic line test equipment which can distinguish a high impedance termination from an open circuit fault.

It is also an object to provide automatic line test equipment which can detect faults caused by crossed wires or by having one wire of a pair connected to either ground or a foreign potential.

The foregoing and other objects are achieved in an automatic line test system. According to one feature of the invention, the line test system stores parameters characterizing each line. The parameters are measured again when the line is in a faulty state. The measured parameters are compared to the stored parameters to determine the location of the fault. In one embodiment, the parameters characterizing the line include data derived from time domain reflectometry data.

According to another feature of the invention, the automatic line test system can localize faults by analyzing measured line characteristics instead of or in conjunction with the time domain reflectometry data. In one embodiment, the system includes a plurality of expert systems which use different methods to segment faults and outputs a prediction of fault location by combining the outputs of the plurality of expert systems. One of the expert systems may be a rule-based expert system which segments faults based on the application of rules. Another of the expert systems may be a case-based expert system which identifies line faults which fall within exceptions to the rules and reclassifies the fault. Still another of the expert systems may be a machine learning system which segments faults from a decision tree constructed from historical failure data.

According to another feature of the invention, the automatic line test system includes circuitry to detect high impedance terminations connected to the telephone line.

According to yet another feature of the invention, the automatic line test equipment detects crossed and grounded telephone wires by injecting a signal into one wire of the pair and measuring the voltage at the other wire of the pair while the line is resistively terminated. In one embodiment of the invention, the voltage is measured several times with a volt meter having different input impedances and the effect of the voltmeter on the measured voltage is mathematically corrected. In another embodiment, the line is resistively terminated by instructing the subscriber to place a telephone off-hook.

According to still another feature of the invention, a complete path between a central office and a network interface device is checked by identifying a pattern in a reflected pulse.

BRIEF DESCRIPTION OF THE DRAWINGS

The invention will be better understood by reference to the following more detailed description and accompanying drawings, in which

FIG. 4 is a sketch illustrating the structure of databases used by the automatic line test system of the invention;

DESCRIPTION OF PREFERRED EMBODIMENT

Figure 1:
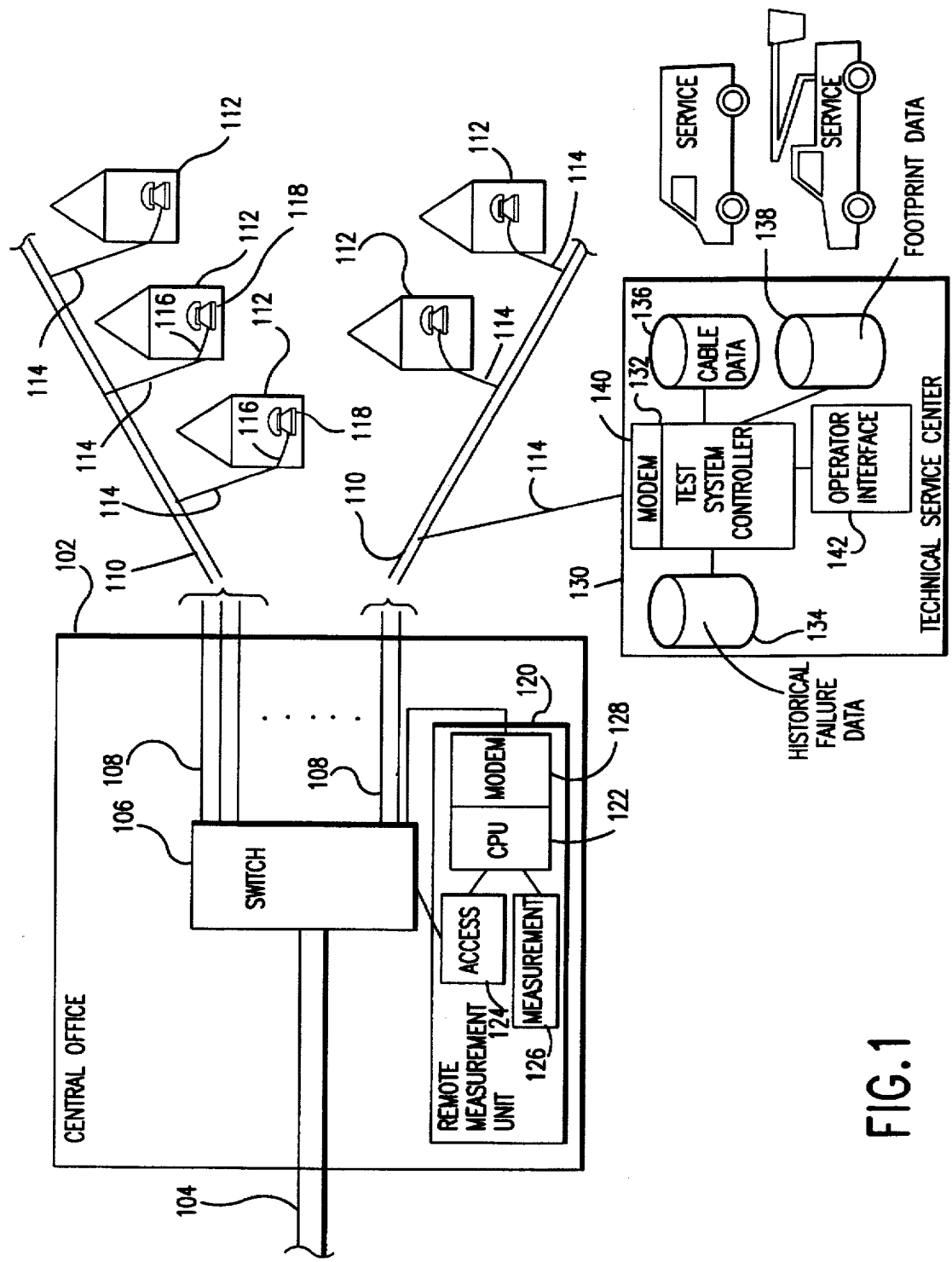
FIG. 1 is a sketch of a central office and subscriber lines of a telephone network employing an automatic line test system of the invention.

FIG. 1 depicts a generalized portion of a telephone network which might employ the fault detection and location method and apparatus of the invention. Central office 102 receives a trunk line 104, which connects central office 102 to the rest of the network. Trunk line 104 carries the signals which make up multiple telephone calls.

Inside central office 102, trunk line 104 connects to switch 106. To establish a connection for a telephone call, switch 106 connects trunk line 104 to subscriber lines 108.

Subscriber lines 108 leave central office 102 bundled in cables 110. Cables 110 run throughout the geographic area served by central office 102. Cables 110 run near subscriber premises 112. Each subscriber premises 112 is connected to a cable through a drop 114, which carries a subscriber line to the subscriber premises 112.

Inside subscriber premises 112, the telephone signals are carried on premises wiring 116. Premises wiring connects subscriber equipment 118 to the telephone network.

To detect and locate faults, central office 102 includes remote measurement unit 120. Remote measurement unit 120 is controlled by a CPU 122. CPU 122 is any commercially available microprocessor and supporting hardware. It is programmed using standard programming techniques to control the measurement of various parameters of selected ones of the subscriber lines 108.

Remote measurement unit 120 also includes access hardware 124 and measurement hardware 126. In order to make a measurement, measurement hardware must be connected to a subscriber line 108. Access hardware 124 interfaces with switch 106 to connect measurement hardware 126 to one or more specified subscriber lines 108. Access unit 124 is controlled by CPU 122 and gets access to a subscriber line 108 specified by CPU 122. Access hardware 124 can also configure subscriber lines 108 for making an appropriate measurement. For example, it can have a dial tone placed on the line or have a voltage connected to the line by switch 106.

Measurement unit 126 includes hardware which generates or receives various test signals or makes selected measurements. It measures voltage, current, resistance, capacitance, inductance, frequencies of tones on the line, charge stored on the line and impedance. It also generates pulses and captures the resulting signal on the selected one of the subscriber lines 108 to facilitate time domain reflectometry measurements. The resulting measurements are in digital form such that they can be conveniently passed to CPU 122.

Remote measurement unit 120 could be a commercially available telephone line test system, such as the aforementioned 4TEL® tester. It may be modified to include additional measuring devices or programmed to perform additional functions as described below.

Remote measurement unit 120 is connected to a test system controller (TSC) 132. TSC 132 is often located in a telephone company technical service center 130. In FIG. 1, the connection is shown to be made over the telephone network by means of modem 120 connected to CPU 122 and modem 140 connected to TSC 132. Other means of communication are possible.

TSC 132 is a commercially available general purpose digital computer which has been programmed to perform the data analysis functions described below. An example of a suitable computer is a SUN® work station such as is manufactured by Sun Computer Company.

TSC 132 has access to nonvolatile mass data storage devices such as disk drives or tape drives. The mass data storage devices store several data bases. These data bases hold data which is used to detect and locate faults. Historical failure data base 134, discussed in more detail in conjunction with FIG. 4A below, stores information about faults which were detected in the network and the resulting repairs made when a repair person was dispatched to correct the fault. Cable data base 136, discussed in more detail in conjunction with FIG. 4C below, holds information about each cable 110 and subscriber line 108 leaving switch 106. This information might be stored solely for detecting and locating faults. However, much of the information in cable database 136 is usually stored by a telephone operating company for other purposes. Where the data is already stored, it is sufficient that TSC 132 have access to the stored data. Footprint data base 138, described in greater detail in conjunction with FIG. 4B, below, contains data about each of the subscriber lines 108. The data in footprint data base 108 characterizes each of the subscriber lines 108 at a time when it contains no faults.

TSC 132 is connected to operator interface 142. Operator interface 142 could be any form of computer to human interface. Interface 142 could be simply a video display terminal and a keyboard. However, more elaborate interfaces, such as a simulated voice or a connection to a paging system, could be used.

TSC 132 reports a fault diagnosis to a human through operator interface 142. The report of a fault on one of the subscriber lines 108 indicates whether the fault is in central office 102, in the network connecting central office 102 to a customer premises 112 or within a customer premises 112. This level of detail about fault location allows the operator to dispatch the appropriate personnel to repair the fault. In addition, the type of fault is reported. Faults are classified as shorts, opens, grounds, crosses or noise. This report of a fault and the segment of the network in which that fault occurs is called a "dispatch statement."

Identification and classification of faults is a known function of existing equipment. Shorts, opens, grounds or crosses can be detected from a series of DC and AC measurements on the pair of wires that make up each subscriber line. Noise is determined from a weighted average of AC measurements. Conventional techniques for identifying when each type of fault is present are employed. Accurately segmenting the locations of those faults to telephone company owned wiring or subscriber owned wires without a remote isolation device is, however, new and very useful information.

In some instances, TSC 132 will not be able to locate a fault simply by analyzing measurements. In those instances, it may be desirable for human interaction, in conjunction with measurements by remote measurement unit 120, to precisely locate faults. Where human interaction is required, operator interface 142 allows TSC 132 to indicate to the human operator what human actions are required. The human operator can then instruct the subscriber or a repair person to take various actions to aid in the location of a fault. For example, a subscriber might be instructed to leave his telephone off hook while further measurements are made.

Additionally, operator interface 142 allows a human operator to input information about a faulty telephone line. The information might be used to initiate a test of a particular subscriber line. Alternatively, it might be used in the fault location process. For example, the operator could ask about the number of phones at the subscriber premises and inquire whether all phones exhibited the same problem.

Once a fault is located, a repair person is dispatched to repair the fault. The repair person, after making a service call, reports on the actual fault found and repaired. This information is also provided to TSC 132. It is used for updating the data bases and program used by TSC 132. Information about the actual fault found can be input into TSC 132 through operator interface 142 or through a connection to another telephone company computer (not shown) which stores information about service calls.

Figure 2A:
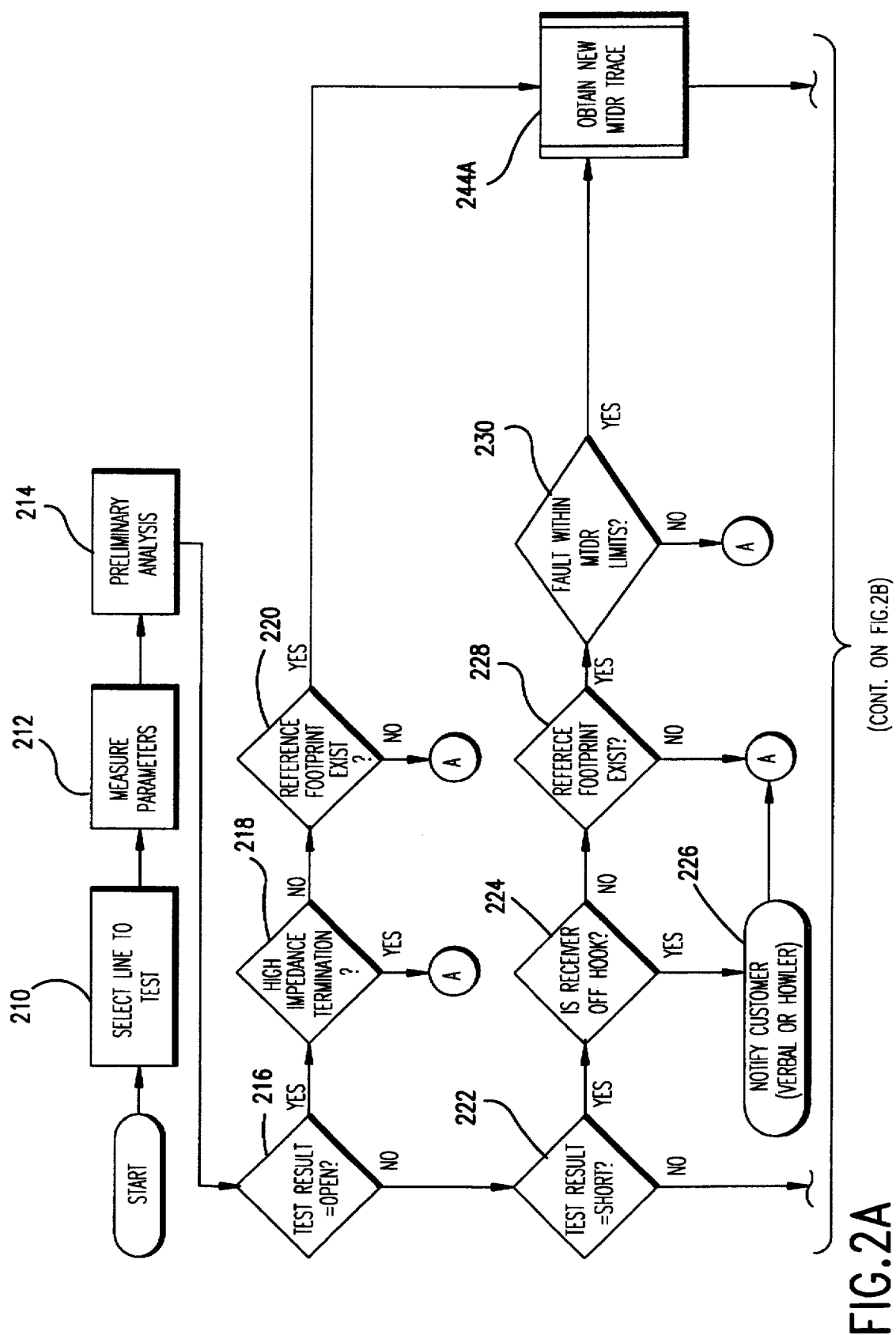
FIG. 2 is a flow chart depicting the method of segmenting faults according to the invention.
Figure 2B:
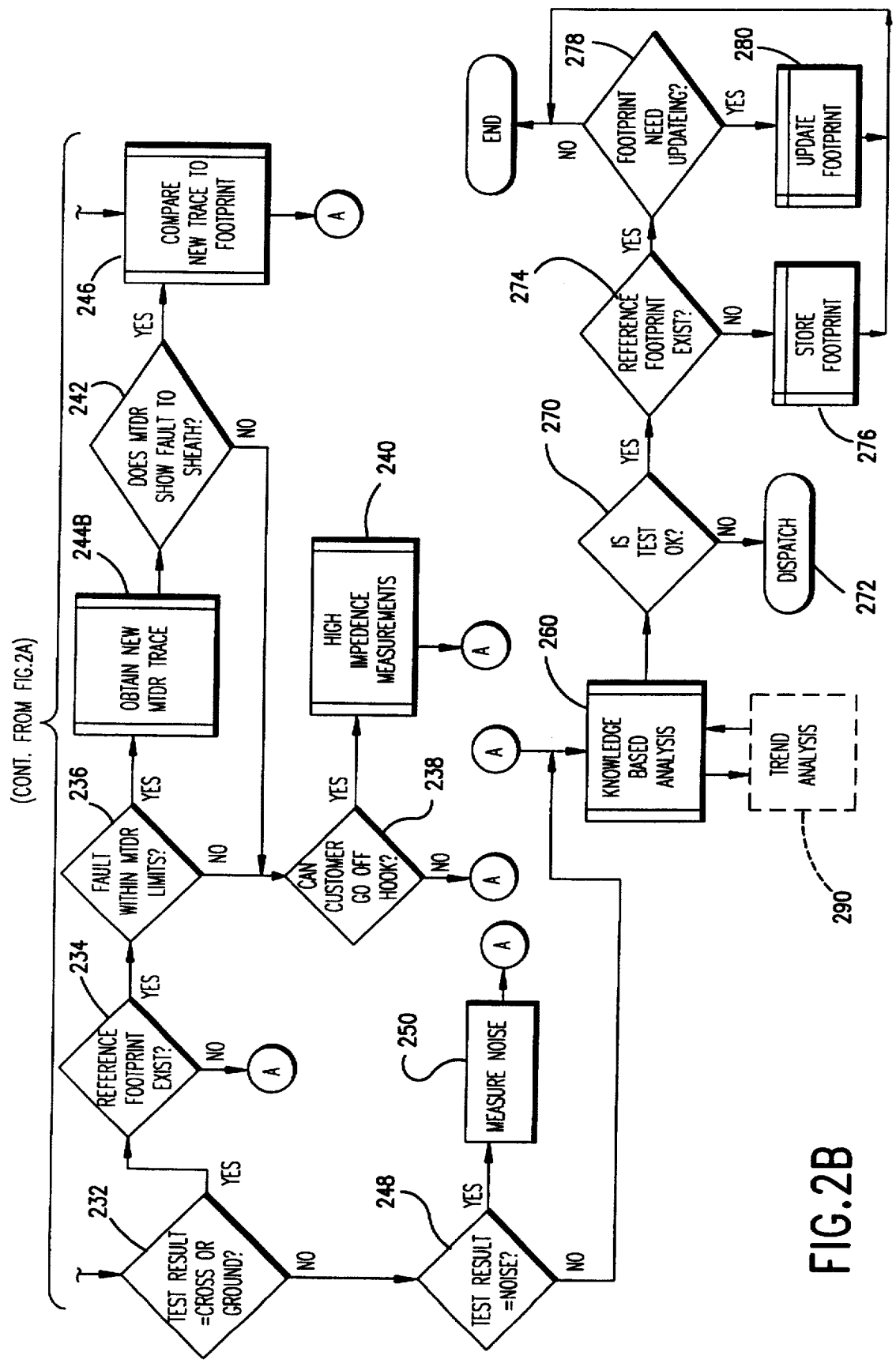

Turning now to FIG. 2, a flow chart of the overall flow of the software controlling a test system made up of TSC 132 and remote measurement unit 120 is shown. Execution of the software begins at step 210 where the line to be tested is selected. All subscriber lines 108 are tested periodically. Additionally, specific lines are tested as a result of inputs through operator interface 142.

At step 212, various parameters of the line are measured. In a preferred embodiment, these parameters are the voltages, currents and admittances. Each subscriber line is made up of a pair of wires which are historically called "tip" and "ring" in the U.S. or "A" and "B" in Europe. In addition, the central office usually applies a DC voltage, called the "battery," to the ring wire and connects the tip wire to ground. The parameters are measured for the various pairs that can be formed from these elements. In addition, some measurements are made with and without the battery voltage connected. The specific voltages measured are the office battery voltage, the tip to ground voltage, the ring to ground voltage, the AC voltage between tip and ground with the battery voltage disconnected from the line, the DC voltage between tip and ground with the battery voltage disconnected from the line, the AC voltage between ring and ground with the battery voltage disconnected from the line, the DC voltage between ring and ground with the battery voltage disconnected from the line. The specific currents measured are the DC tip to ring, DC current ring to tip, DC current tip to ground, DC current ring to ground, DC current tip to battery, DC current ring to battery, DC background current tip to ground and DC background current ring to ground. The specific admittances measured are the tip to ground conductance, the tip to ground susceptance, the ring to ground conductance, the ring to ground susceptance, the tip to ring conductance, the tip to ring susceptance, the ring to tip conductance and the ring to tip susceptance. DC currents are measured by attaching a DC voltage to one wire of the pair. Two current measurements are made, accounting for the possibility that the current may be different depending on which lead of the line to which the DC voltage is connected. Background current is the current flow with no DC voltage attached.

At step 214, the measured parameters are used in a preliminary analysis indicating whether any faults exist on the line. At step 214, the measured parameters are used to calculate an AC and a DC model of the line. In the DC model, the line is modeled as a group of five resistances between each of the four points: tip, ring, battery and ground. The AC model is similar, except for AC modeling, ground and battery are treated as the same point and the connections must be represented as three complex admittances rather than simply resistances.

Once these models are formed, faults are detected when the modeled resistances or impedances are outside of expected levels. For instance, a DC short is indicated when the resistance between tip and ring is lower than some threshold, around 1 M$\Omega$.

At decision block 216, the results of the preliminary analysis performed at step 214 are checked. If the results indicate an open circuit fault, analysis proceeds to decision block 218. Decision block 218 determines whether the measured parameters are incorrectly indicating a failure due to the presence of an high impedance termination on the line. Traditionally, telephones and other items terminating telephone lines had ringers which conducted AC currents regardless of the voltage levels applied. More recently, telephones are made with solid state ringers or include a zener diode in series with the ringer. These ringers, called high impedance ringers, do not conduct current unless the applied voltage exceeds a threshold which at times can cause the telephone to ring. As line testing is often done at night, it is not desirable to apply voltages for testing which would be large enough to cause the telephone to ring. Accordingly, an high impedance termination on the line may produce measured parameters in the same range as a line with an open circuit fault. To avoid incorrectly indicating an open circuit fault, decision block 218 tests for the presence of an high impedance termination. If the appearance of an open circuit fault was actually caused by an high impedance termination, analysis proceeds to the point labeled A.

If, however, the test data indicating the presence of an open circuit fault can not be explained by the presence of a high impedance ringer, analysis proceeds to decision block 220. Decision block 220 determines whether a reference footprint for the selected line exists. The footprint is a collection of parameter values measured for the line when it was believed to be free of faults.

In addition, the footprint contains a trace made by MTDR. MTDR is a technique in which an electrical pulse is applied to the line. Any discontinuities in the line, such as a short, open or a connector will cause a portion of the pulse to be reflected back towards its source. The reflected signal is captured. The time at which reflected pulses are received indicate the distance of the discontinuities from the source. If there is a stored footprint with an MTDR trace, execution proceeds to step 244A at which an MTDR trace of the line in the faulty condition is made. This trace is used in analysis which locates the fault.

If at decision block 216 no open circuit fault was found, execution proceeds to decision block 222. Decision block 222 examines the values in the AC and DC models to determine whether they are consistent with the presence of a short circuit. For example, if the resistance between tip and ring is computed to be very low, it indicates the presence of a short. If a short is indicated, execution proceeds to decision block 224.

Decision block 224 determines whether the measured parameters which indicated a short circuit were actually caused by the receiver of a telephone in the subscriber premises being off the hook. This determination is made by a comparison of resistance measured at a high and low voltage.

If the short was indicated because the receiver was off hook, execution proceeds to step 226 where an effort is made to notify the subscriber that the receiver is off hook. This notification can be given by a loud tone, called a "howler tone," being sent over the line. Alternatively, if the customer called to complain about a problem with the line, a message might be sent through operator interface 142 to have the operator notify the customer if possible. After the customer is notified, execution proceeds to the point labled A.

If, however, decision block 224 does not determine that the appearance of a fault was caused by the receiver being off hook, analysis proceeds to decision block 228. Decision block 228, like decision block 220, determines whether there is a reference footprint stored for the line.

If a footprint exists, execution proceeds to decision block 230. Decision block 230 determines whether an MTDR trace can aid in locating the short circuit. MTDR is only useful in identifying faults in which the discontinuity is sufficiently great to create a reflected signal large enough to reliably measure. If the DC model of the line shows that the resistance between tip and ring is less than 1000 ohms, the discontinuity in the line is usually sufficient to produce a reflected pulse large enough to measure. If the short is within the appropriate range, execution proceeds to step 244A where an MTDR trace is measured. If the short is not in the appropriate range or no stored footprint exists, execution proceeds to the point labeled A.

If decision blocks 216 and 222 did not detect either an open or a short, execution proceeds to decision block 232. Decision block 232 checks the result of the preliminary analysis to determine whether a cross or a ground fault is indicated. A ground is indicated in the DC model by a resistance between either tip or ring and ground which is below the value expected for the line. Likewise, a cross is indicated by a low resistance in the DC model between either tip or ring and battery. If a cross or a ground fault is indicated, execution proceeds to decision block 234.

Decision block 234 checks whether a reference footprint has previously been stored for the line as in decision block 220. If no reference footprint exists, execution proceeds to the point labeled A. If the footprint exists, execution proceeds to decision block 236.

Decision block 236 determines whether the cross or ground fault is the type which can be located with MTDR. If the DC model shows that the connection is of sufficiently low resistance, usually less than 1000 ohms, the fault will reflect a sufficient signal to perform MTDR analysis. When the DC model shows the cross or ground outside of this range of values, execution proceeds to decision block 238.

Decision block 238 determines whether human interaction can be employed to make further measurements. Human interaction might be available when the subscriber has called to complain of the fault or when a repair person has been dispatched to the premises to make a service call.

Inputs entered by the operator through the operator interface 142 will dictate whether human interaction is available. If human interaction is possible, information is sent through operator interface 142 indicating that the subscriber line should be resistively terminated, such as by placing a receiver at the subscriber premises off hook.

With the receiver off hook, execution proceeds to step 240 where another series of measurements are made. Step 240 takes a series of measurements using a high input impedance voltmeter, which does not corrupt the measured voltages by drawing current from the other leg of the subscriber line. These voltages are used to calculate the resistance of the line from the central office to the fault. This information is useful for locating the fault. The line resistance is directly related to line length. The resistance of the line to the fault can be compared to the resistance of the line stored in the footprint. The change in line resistance tells the distance of the fault from either end of the line.

If decision block 238 determines that the receiver can not be placed off hook, execution proceeds to the point marked A. Likewise, once the high impedance measurements are taken at decision block 240, execution proceeds to the point marked A.

If, however, decision block 236 determines that the short or cross can be localized with MTDR data, execution proceeds to step 244B. Step 244B is similar to step 244A, described below, and an MTDR trace is obtained.

Execution then proceeds to decision block 242. Decision block 242 analyzes the MTDR trace to determine whether the fault is caused by an improper connection to the cable sheath. This type of fault often produces a discernible reflection in the MTDR trace which can be used to localize the fault. Decision block 242 checks the MTDR trace for a negative going pulse which occurs at a time indicative of a discontinuity in the cable. The times which indicate discontinuities in the cable are determined from the MTDR trace stored in the footprint for the line under test. This analysis is similar to that performed in step 246, which is described below.

If decision block 242 determines that the MTDR trace will be useful in locating the fault, i.e. it is a fault to the sheath, execution proceeds to step 246, where the MTDR data is placed in a form for further analysis. Step 246 is described in greater detail below. However, if decision block 242 determines that the MTDR data will not be useful in locating the fault, execution proceeds to decision block 238 for processing as described above.

Once it has been determined, either at decision block 220 or 230, that an MTDR trace might be useful in locating a fault, execution proceeds to step 244A. At step 244A, a MTDR measurement of the line in its faulty state is made. The MTDR measurement is performed by measurement hardware 126. Measurement hardware 126 generates a pulse on the line.

Once the pulse is sent, measurement hardware 126 then records changes in the signal on the line. These changes represent reflections of the pulse from discontinuities in the line. Preferably, the response to several pulses is measured and the results are averaged together. This averaging cancels out the effects of noise on the line so that small reflections can be observed.

Figure 5:
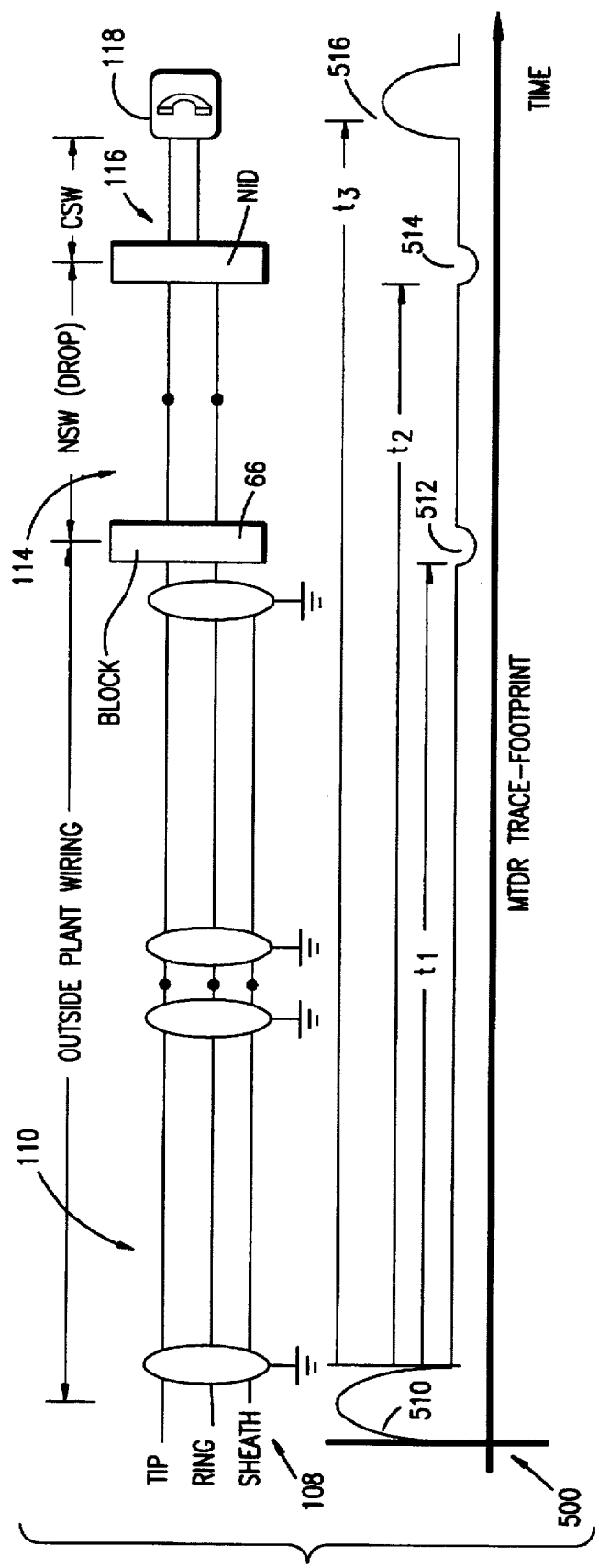
FIG. 5 is a sketch useful in understanding the use of MTDR in fault segmentation according to the invention.

Once an MTDR trace is obtained in the faulty condition, execution proceeds to step 246. Step 246 compares the MTDR trace to the trace in the footprint and extracts information about the change in the MTDR trace. FIG. 5 shows an MTDR trace juxtaposed with a sketch of a subscriber line 108. MTDR trace 500 starts with incident pulse 510. Pulse 510 travels through cable 110. Where subscriber line 108 transitions from cable 110 to drop 114, there is a discontinuity in the electrical properties of subscriber line 108. Reflected pulse 512 is generated at this discontinuity. Likewise, there is a discontinuity at the network interface device interfacing drop 114 to subscriber wiring 116. Reflected pulse 514 is generated at this discontinuity. Subscriber line 108 is terminated at subscriber equipment 118. Reflected pulse 516 is generated at this termination.

The time differences, $t_1$, $t_2$ and $t_3$, between the incident pulse 510 and each of the reflected pulses 512, 514 and 516, respectively, is proportional to the distance to the discontinuity which caused the reflection.

Reflected pulses 512 and 514 are shown as negative pulses whereas reflected pulse 516 is shown as a positive going pulse. The polarity of the reflected pulse will depend on the nature of the discontinuity. A transition to a higher impedance portion or an open circuit generates a positive pulse. In contrast, a transition to a lower impedance or short circuit generates a negative going pulse.

Other discontinuities might be present on subscriber line 108 such that other or different reflected pulses might appear in MTDR trace 500. For example, some subscriber lines include load coils or other devices which fully reflect incident pulse 510. When such devices are present on the line, there are no reflections from any portions of the line beyond the device.

At step 246, the MTDR measurement in the footprint and the MTDR measurement of the faulty line are compared and information useful for locating faults is extracted. The comparison is made by subtracting the footprint from the MTDR trace of the faulty line to emphasize any differences. Block 246 attempts to locate reflected pulses 512, 514 and 516 in the reference trace from the footprint. For each such reflected pulse found, block 246 attempts to locate a corresponding reflected pulse in the trace of the faulty line. For each reflected pulse identified, block 246 makes a record of the time of occurrence of the pulse, its polarity and its amplitude. In addition, block 246 checks the trace of the faulty line for reflections not found in the reference trace. Block 246 makes a record of these reflected pulses as well. Execution then proceeds to the point labeled A where the collected data is analyzed.

If the preliminary analysis at block 214 indicated neither an open, short, cross or ground, execution proceeds to decision block 248. Decision block 248 checks whether the test results indicate a faulty condition is being caused by noise. Noise is indicated when the average value of the AC signal on the line, when no signal is being driven on the line, exceeds a threshold.

If noise is indicated, execution proceeds to step 250 where the noise is measured more quantitatively. Step 250 directs measurement hardware 126 to measure the C-weighted value of the signal on the line for systems installed in the US. In Europe, a psophometric average is used. This measurement is useful in inferring the source of the noise and execution proceeds to the point labeled A.

Decision blocks 216, 222, 232 and 248, when taken in combination, check for the fault types which a preferred embodiment of the system of the invention detects. If no such fault is detected, execution proceeds to the point labeled A.

At the point labeled A, the collected data is analyzed. The analysis serves several purposes. First, it confirms the preliminary assessment of the fault type made during the preliminary analysis at step 214. Second, it generates a dispatch statement indicating where a repair person should be sent to locate the trouble. Third, if no fault is found to presently exist on the line, it analyzes recent data collected on that line to determine whether its performance is degrading such that it should be repaired before it fails.

In a preferred embodiment of the invention, the data is analyzed with knowledge based analysis techniques at step 260. The software which implements these techniques are sometimes called expert systems. The expert systems employed at step 260 are described more fully in conjunction with FIG. 3 below.

The output of the knowledge based analysis at step 260 is an indication of the fault type and a prediction of its location. At decision block 270, this information is checked. If a fault is found, execution proceeds to step 272 where a report is made to the operator through interface 142. The report recommends that a dispatch statement be issued to have a repair person repair the fault. The information provided to the operator indicates whether the fault is an open, short, cross, ground or noise and whether it is most likely in the central office, the cable, the drop or the customer premises.

If no fault was found, decision block 270 diverts execution to decision block 274. Decision block checks whether there is a reference footprint stored in footprint database 138 for that line. If there is no footprint, execution proceeds to step 276, where the measurements taken on the line are stored. If further measurements need to be taken to complete the footprint, such as an MTDR trace, step 276 issues the appropriate commands to remote measurement unit 120 to have the measurements made.

If, however, a footprint is stored, execution proceeds to decision block 278. Decision block 278 examines a flag set at step 260 to determine whether the expert systems included in step 260 found the stored footprint up to date. A footprint of a line can change as subscriber equipment is added or removed from the line. It can also change as a result of changes in the network, such as the removal of a load coil. If this flag was set, execution proceeds to step 280 where an updated footprint is stored.

If there is already an up to date footprint stored, the test cycle is complete and execution ends. The steps shown in FIG. 2 are repeated when another line is to be tested.

Figure 3A:
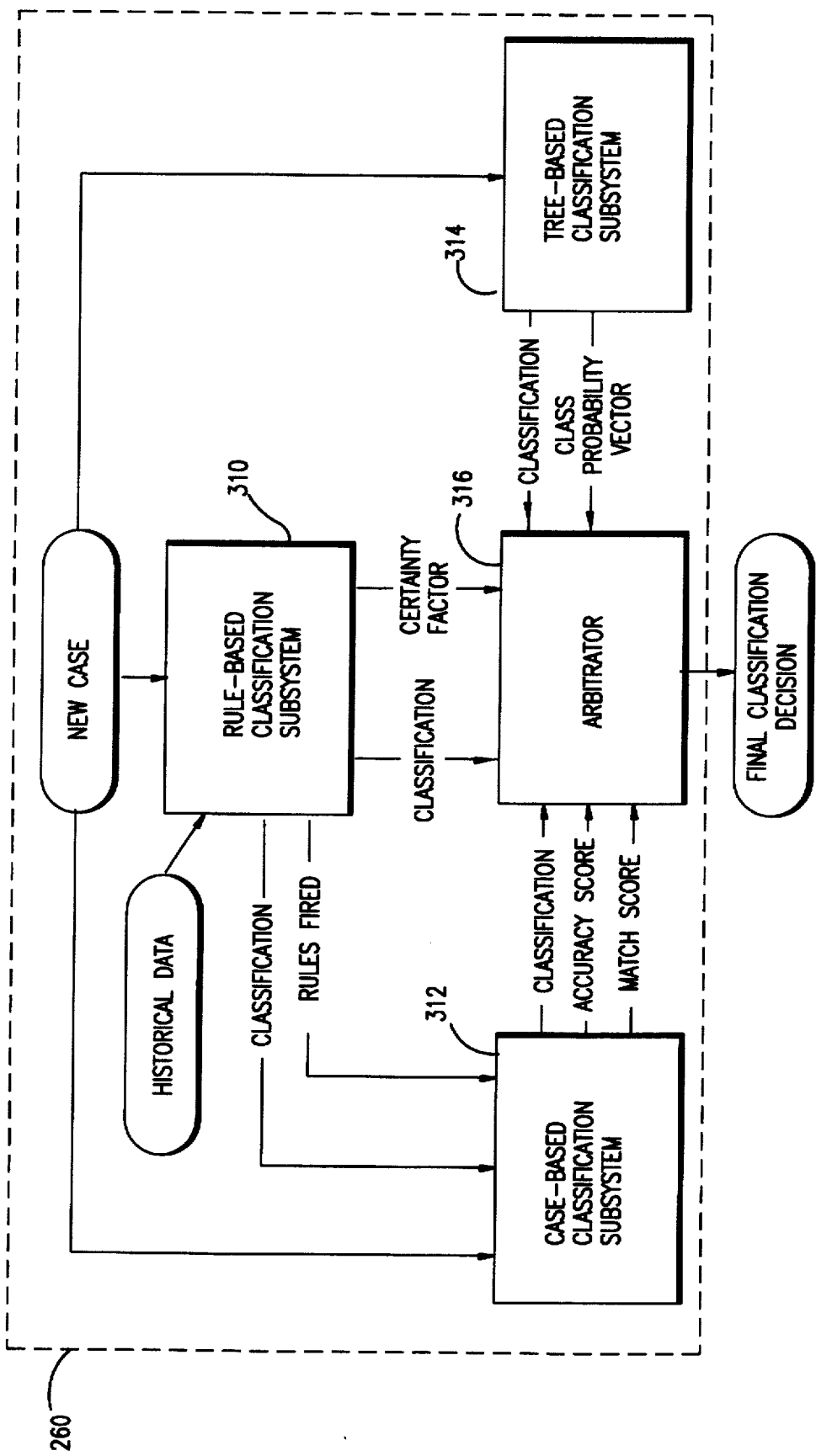
FIG. 3 is a flow chart depicting in greater detail the expert system portion of the flow chart in FIG. 2.

Turning now to FIG. 3A, a block diagram of the expert system software making up step 260 is shown. FIG. 3A shows an expert system architecture similar to what is known as a "blackboard" expert system. In this type of system, different experts contribute to the solution of a problem by providing inputs to an "arbitrator," which makes a final decision based on all the inputs. A traditional blackboard system, though, has expert systems which approach different aspects of the problem. Here, the separate expert systems providing inputs to the arbitrator are all attempting to solve the whole problem, but operate based on different paradigms.

The expert system software is made up of four separate expert subsystems: rule based classifier 310, case based classifier 312, tree-based classifier 314 and arbitrator 316. Each expert system is coded as a separate task which is executed in TSC 132. Execution of the tasks may be scheduled in any convenient manner. They may run partially in parallel or completely sequentially. It is necessary, though, that rule based classifier 310 produce an output before case based classifier 312 operates. Also, it is necessary that rule based classifier 310, case based classifier 312 and tree based classifier 314 all produce outputs before arbitrator 316 produces an output.

Rule based classifier 310 is developed from commercially available expert system software. A suitable commercially available software package is CLIPS, which is sold by the United States National Aeronautics And Space Administration. CLIPS accepts a set of rules specified by an expert. Each rule is in the form of an IF THEN statement. An example is IF the MTDR data indicates the faulty line is 100 feet or more shorter than the length of the line used to make the reference footprint, THEN the fault is not in the subscriber premises. The rules are developed by a human expert familiar with telephone networks.

In addition, the human expert assigns a certainty factor to each rule. The certainty factor is the human expert's opinion on how often the rule holds true. In the example rule given above, the rule provides an incorrect conclusion when the premises wiring is longer than 100 feet and the fault occurs in the premises wiring more than 100 feet from the end. The human expert takes these exceptions into account when assigning a certainty factor.

Rule based expert system 310 accepts as input all of the measurements made in the process of FIG. 2. This collection of inputs represents a test case. Rule based expert system 310 then applies the rules to this input case. By combining the certainty factors of the rules, it produces an overall classification and an overall certainty factor. This information is provided to arbitrator 316.

The classification derived from rule based classifier 310 is also provided to case based classifier 312. In addition, a list of the rules fired in rule based classifier 310 is provided to case based classifier 312. The rules fired are the rules which had an IF portion matching the test case.

Case based classifier 312 is also implemented from a commercially available case based expert system program. A suitable commercially available program is ART-IM, which is a product of Inference Corporation. The case based classifier is programmed with a data base of prior test cases in which the classification produced by the rule based classifier was found to be incorrect when a repair person was dispatched to make the repair. Case based classifier 312 matches the current test case to the closest exception case in its database.

Case based classifier 312 provides the actual fault location of the selected exception case to the arbitrator as the classification. In addition, case based classifier 312 produces two scores which indicate how much that data should be relied upon.

A "match score" is computed for each record in the exception data base. It is a weighted average of the differences between each of the current measured parameters and the values for those same parameters stored in the record. The weighting factors are determined from experience based on how significant the value of a parameter is in creating an exception to a rule. The record in the data base which produced the highest match score is selected as the closest exception case. Its match score is provided to arbitrator 316.

An "accuracy score" is also produced. The accuracy score is computed by selecting all records in the exception data base with a match score above a certain threshold. That threshold is set from experience but is typically within 25% of the highest match score for any record in the exception database. The true fault locations which were assigned to those records are compared to the true fault location of the record with the highest match score. The accuracy score is the percentage of the selected records having the same true fault location as the record with the highest match score.

Both the highest match score and the accuracy score are provided to arbitrator 316 along with the true (i.e. CLOSE OUT) fault location of the selected exception record. The higher the match and accuracy scores are, the more likely it is that the classification provided by rule based classifier 310 falls within an exception to a rule. Thus, by employing both a rule based classifier and a case based classifier which recognizes exceptions to rules based on historical data, it is possible to accurately segment faults without having a priori an exhaustive list of all rules and exceptions to those rules.

The third expert system is tree based classifier 314. Tree based classifier 314 is implemented by a commercially available machine learning expert system. A suitable machine learning expert system is IND sold by the United States National Aeronautics and Space Administration.

A machine learning expert system builds a decision tree by analyzing a database of previously solved cases. Here, historical failure database 134 is used. The machine learning system uses the solved cases to find statistical correlations between parameters or groups of parameters and the various classifications.

The relationships may be determined mechanistically by repeatedly running search algorithms through the historical data. The amount of time needed to prepare a decision tree can be reduced if an human expert instructs the machine learning system to ignore some parameters or specifies certain parameters which are highly correlated to some classifications. Known machine learning systems accept inputs from human experts to guide the learning process.

The decision tree used by tree based classifier 314 has a series of nodes and branches. The tree starts at a root node. One parameter is selected to define the branches from the root node. The machine learning system defines ranges of that parameter which are correlated with specific outcomes. For each range of values of that parameter, one branch leaves the root node.

Each branch runs either to another decision node or is a terminal node called a leaf. At each decision node, the tree again branches based on ranges of another parameter defined by the machine learning system. Once the tree is constructed, a particular test case may be mapped to a specific leaf in the tree by deciding at each decision node which branch to take. A branch is selected when the measured value of the parameter in the test case falls in the range for that branch.

Each leaf has associated with it a classification and a probability vector. Also, each leaf has associated with it a path from the root node. The path defines the ranges of all the parameters which must be satisfied to reach that leaf. The probability vector is the conditional probability, computed from the historical data, that the classification assigned to the leaf is the correct classification when the parameters fall within the ranges needed to reach that leaf. The higher the probability, the greater the likelihood that the classification assigned to the leaf is the correct classification for the leaf.

The machine learning system used to create the decision tree searches the historical data base for ranges of parameters which have a high probability of being associated with a particular classification. In some instances, these ranges will correspond to rules previously known by the human expert who programmed rule based classifier 310. However, the use of a machine learning system and historical data allows for the possibility that previously unknown relationships between parameters and fault classifications will be discovered.

The classification and probability vectors are both provided to arbitrator 316. Arbitrator 316 is preferably a rule based expert system implemented with one of the aforementioned commercially available expert systems. It is programmed with rules which construct a dispatch statement.

It relies most heavily on the classifications provided by the expert system with the highest scores. For example, if the probability vector provided by tree based classifier 314 were very high and the certainty factor from rule-based classifier 310 were very low, the classification from tree-based classifier 314 would be selected. Likewise, arbitrator 316 would be programmed with rules which favor the classification provided by two of the three expert systems.

In some instances, the classification systems provided by rule based classifier 310, case based classifier 312 and tree-based classifier 314 will be different, but all will have similar confidence metrics. "Confidence metrics" is used herein as a general term for the numbers such as the certainty factor, match score, accuracy score and probability vector which indicate how likely it is that the classification produced by an expert system is correct. In that situation, arbitrator 316 evaluates whether additional information can be obtained to facilitate diagnosis.

Further tests might be run. Alternatively, an effort might be made to get additional information from the subscriber about symptoms of the fault. For example, the operator might be instructed to contact the subscriber to find out whether the subscriber has multiple telephones and whether the symptoms are the same on all phones. Other options would be to have the subscriber plug a phone into a different phone jack or to plug the telephone directly into the network interface device, if feasible. The results of these actions could then be used to isolate the fault.

When the fault can still not be located, arbitrator 316 issues a dispatch statement based on non-fault criteria. The criteria could be dictated by cost. The service call which is least expensive could be made first. Alternatively, the dispatch could be made based on the faults which are most likely to occur. For example, if cable faults are 10 times more likely to occur than either a central office or subscriber premises fault, the dispatch would be first made to check for faults in the cable. Still another alternative would be to dispatch service personnel based on telephone company policy. For example, the first dispatch might be to the subscriber premises so that the subscriber would perceive that the telephone company had responded to its complaint. Alternatively, the telephone company might prefer not to dispatch a repair person to a subscriber premises until after it had checked for faults in telephone company equipment.

As arbitrator 316 is a rule based expert system, it may be programmed with any alternative dispatch rules desired.

Figure 3B:
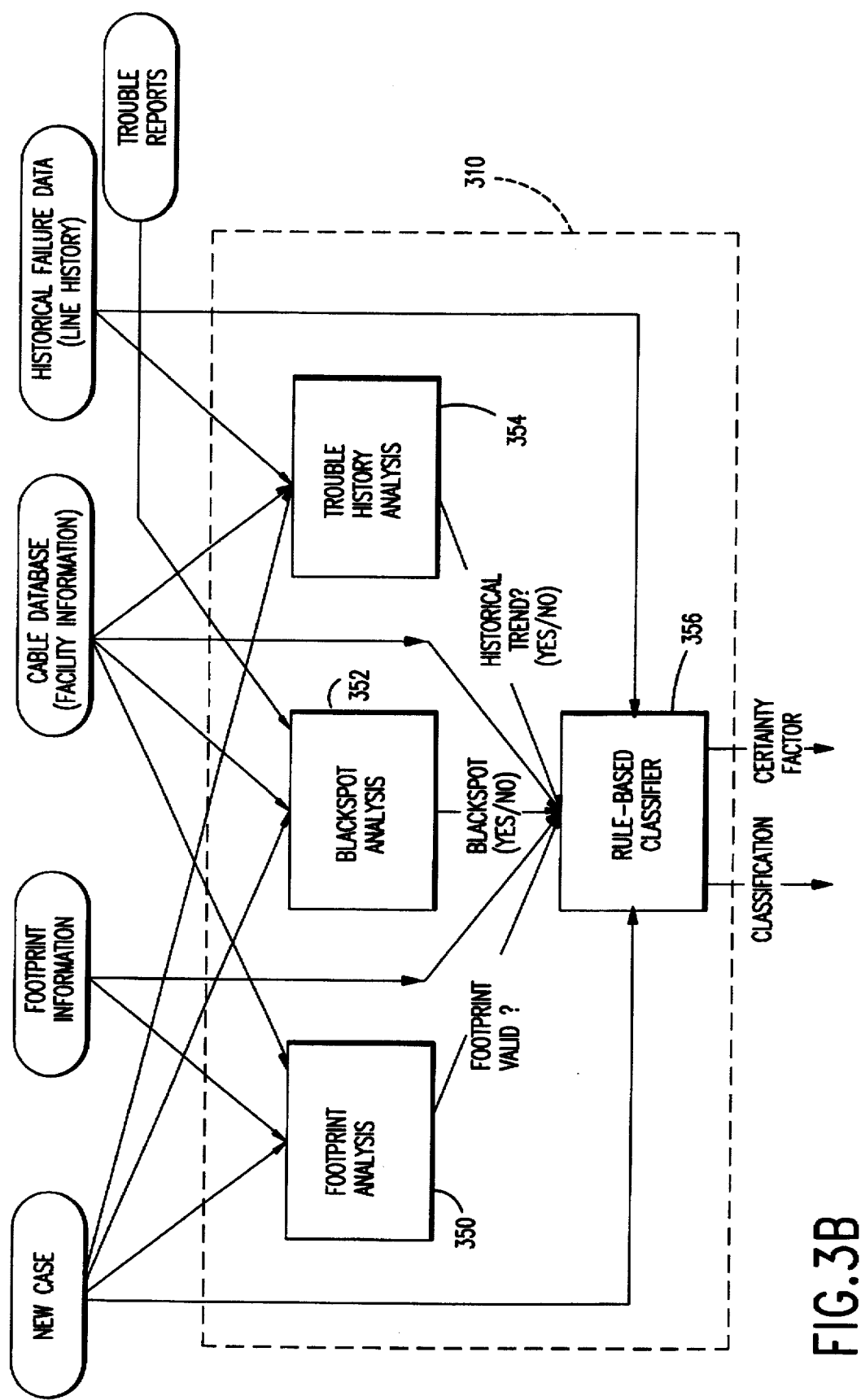

Turning now to FIG. 3B, additional details of the rule based classifier 310 are shown. Rule based classifier 310 is actually made up of four separate rule based expert systems operating as a blackboard expert system. Footprint analyzer 350, black spot analyzer 352 and trouble history analyzer 354 are each programmed with rules relating to a specific topic. They draw intermediate conclusions which aid in the overall fault classification process performed by rule based classifier 356.

Footprint analyzer 350 determines whether the stored footprint for the line under test is still valid for use in locating faults. Over time, either the network, the premises wiring or the subscriber equipment might change. The network might change, for example, if a load coil is removed from the subscriber line. Another example is where a pair of wires is disconnected from one premises and is thereafter used to provide service to a different premises. The premises wiring or equipment might change if, for example, the subscriber adds a phone extension or buys a new phone.

Footprint analyzer 350 is programmed with rules which define when a footprint can and can not be used. Some rules can be expressed as comparisons between the test case parameters and the stored footprint. Other rules can be expressed as comparisons between the information in the facilities data base about the current condition of the network and the conditions when the footprint was made. Other rules can be expressed merely in terms of the passage of time. Accordingly, FIG. 3B shows that footprint analyzer 350 derives information from the test case, the footprint data base and the cable data base. The output of the footprint analyzer is a footprint valid flag indicating whether the stored reference footprint is up to date.

The footprint valid flag is used by rule based classifier 356. Rule based classifier 356 is programmed with rules which segment the fault in the telephone network. Some of the rules programmed into ruled based classifier 356 are expressed in terms of a comparison between the test case for a suspected faulty line and a stored footprint for that line. These rules are qualified by the footprint valid flag. If the flag is set to indicate that the stored footprint for the line is no longer valid, those rules are ignored.

The footprint valid flag is also used at decision block 278 (FIG. 2). When the flag is set indicating that the footprint needs to be updated, decision block 278 diverts program execution to step 280 where an updated footprint is stored as previously described.

Black spot analyzer 352 draws conclusions useful in diagnosing fault locations based on trouble reports in other parts of the telephone network. For example, if there have been complaints about loss of service in 25% of the subscriber lines routed through a particular cable, then it is highly likely that there is a fault in that cable. Alternatively, if there is a high number of failures in the subscriber lines connected to one particular interface card in the central office, then it is highly likely that the fault is in the central office.

To draw these conclusions, black spot analyzer 352 needs access to information about how each subscriber line relates to other subscriber lines, cables and equipment in the network. This information is traditionally kept by local telephone companies and is stored in cable data base 136 (FIG. 1). Also, it is necessary for black spot analyzer 352 to have access to information about other failures in the network which have not yet been repaired. This data is stored in the memory of TSC 132 (FIG. 1). It reflects trouble reports which have been entered into TSC 132 through operator interface 142 or failures which were detected by TSC 132 during routine tests of telephone lines.

Trouble history analyzer 354 draws conclusions about whether there is either a trend in degradation in performance on the subscriber line or an history of similar problems on that line. For example, a gradual increase in noise level on a line is characteristic of a problem more likely to be associated with equipment in the central office than with the drop. Alternatively, some problems recur because the underlying cause is not corrected. For example, if a line has experienced trouble in the past because a junction box has allowed water to leak into a cable, it is likely that a repeat of a similar problem is due to the fact that the same cable is again leaking.

The conclusions drawn by footprint analyzer 350, black spot analyzer 352 and trouble history analyzer 354 are provided to rule based classifier 356. Rule based classifier 356 is preferably another rule based expert system. It is programmed with rules to make predictions about failure locations based on the conclusions drawn by footprint analyzer 350, black spot analyzer 352 and trouble history analyzer 354 and based on information about the current line, including footprint information, cable data and historical failure information. The output of rule based classifier 356 is the predicted classification and certainty factor which is provided to arbitrator 316 (FIG. 3A).

Turning now to FIG. 4, additional information on the databases kept by TSC 132 (FIG. 1). FIG. 4A shows the structure of records stored in historical failure database 134. Each record in the database represents one failure which has been diagnosed by the system and then repaired by a repair person. This database could be initially empty when TSC 132 is installed. It would be built up as the software in FIG. 2 were executed. Alternatively, it should be noted that the data in FIG. 4A does not relate to any specific telephone line. Accordingly, this database could be copied from a similar test system controller installed on another telephone network that had built up an historical failure database. Alternatively, it could be built up quickly after TSC 132 is installed by inducing faults in the network and then executing the software of FIG. 2.

The first field in the record is entitled RULES TRIGGERED. This field stores a list of the rules which were triggered in rule based classification subsystem 310 (FIG. 3A). As described above, each of the rules is expressed in the form of an IF THEN statement. A rule is said to be triggered when the IF portion of the rule is satisfied. Each rule is given a unique identifying value, for example a number. Thus, the RULES TRIGGERED field stores a list of these identifying values.

The next field is titled DISPATCH. This field stores an indication of the output of arbitrator 316 when the failure reported in the record was processed. As described above, the dispatch statement indicates the type of fault detected and the location, i.e. in the central office, in the cable, in the drop or in the customer premises.

The next field is titled CLOSE OUT. This field stores the actual fault type and location found by the repair person when dispatched to repair the fault. Currently, this information is kept by local telephone companies in their service databases. The information could be copied from the telephone company service data base or entered into TSC 132 after the fault was repaired.

The next field is entitled CONFIGURATION DATA. This field records information about the type of equipment used to make the diagnosis on which the dispatch statement was based. For example, remote measurement unit 120 could be provided by any one of a number of manufacturers. The remote measurement units provided by different manufacturers generally provide the same information. However, some products may report an impedance while others will provide the same information in terms of an admittance. Accordingly, the information on configuration could be used to convert the information provided by remote measurement unit 120 into a standard format. Additionally, this information can be useful in tracking software changes. For example, if the software operating TSC 132 is updated with new rules to diagnose a particular class of failures, the record of a failure diagnosed with the old software might be excluded by some rules.

The next fields in the record are entitled DC MODEL and AC MODEL. This information represents the values computed for the DC model and AC model, respectively, of the line in its faulty state.

The next field is entitled PARAMETER VALUES. This field stores the values measured at step 212. In addition, it stores a range value for each parameter measured. In some instances, measurements are made by equipment which performs autoranging. As a result, the accuracy of each measurement depends on the range used by the measurement equipment. For example, a voltage meter having 0.5% accuracy which automatically selects among ranges having full scale values of 1 mV, 1V, 10V and 100V will produce measurements with an accuracy of 5 μV, 5 mV, 50 mV or 500 mV, depending on which range was used to make the measurement. Accordingly, the range, or alternatively the accuracy, of the measurement is stored. This provides a confidence factor that can be used in rules arbitration.

The next field is entitled PREMISES EQUIPMENT. This field stores information about the premises equipment detected by remote measurement unit 120. The information includes the number of regular ringers detected, the number of high impedance ringers detected and the observed signature of any premises equipment, such as a PBX. Techniques for detecting normal ringers and device signatures are well known. A technique for detecting high impedance ringers is described in greater detail below.

The next field is entitled TIME STAMP. This field records the time and date when the record about the failure was entered into the database.

Turning now to FIG. 4B, details of the footprint data base 138 are shown. Footprint database 138 contains numerous records. Each record corresponds to measurements taken on one subscriber line at a time when the line was believed to be functioning and free of faults. This database is initially empty when TSC 132 is installed. It is built up by repeated execution of steps 276 and 280 (FIG. 2).

The first field in footprint data base 138 is entitled EQUIPMENT NUMBER. This field holds a unique identifier assigned to each of the subscriber lines 108. Telephone companies normally assign a unique number to each subscriber line, which is stored in this field.

The next field is entitled DIRECTORY NUMBER. Each subscriber is given a telephone, or directory number, by the telephone company. Then, a specific subscriber line is connected from the switch 106 to the customer premises 112. It is possible that the directory number carried on a particular subscriber line might change. It is also possible that the subscriber line used to carry phone calls for a particular directory number might change. As a result, both the EQUIPMENT NUMBER and the DIRECTORY NUMBER of a particular subscriber line at the time the footprint was made are stored.

The next field in the record stores the MTDR trace of the line. This information is stored as successive digital values representing measured voltages on the telephone line after a pulse was sent down the line. In addition, this field records the parameters of the pulse, including its amplitude and duration.

The remaining fields of each record in the footprint database correspond to fields in the historical failure database. The only difference, though, is that the values stored in a record of the historical failure database were measured when a failure was believed to be present while the values stored in a record of the footprint database were stored when no failure was believed to be present.

Turning now to FIG. 4C, information on the records stored in cable database 136 are shown. This information represents information which is normally kept by a local telephone company to operate its network. Where not kept by the telephone company, it can be gathered from observations made on the network.

Each record in the cable database describes one subscriber line. There should be one record for each subscriber line.

Each record includes a field for EQUIPMENT NUMBER and for DIRECTORY NUMBER. These fields have the same meaning as described above.

Each record also includes a field entitled CABLE NUMBER. Each cable 110 is assigned a unique identifier. The cable in which the subscriber line is carried is stored. Where a line is carried through multiple cables, then this field contains a list of cables through which the subscriber line is routed.

The next field in the record is entitled SWITCH CONNECTIONS. Each subscriber line 108 is connected to switch 106. Switch 106 contains different interface cards, each of which is assigned an identifying number. The number of the interface card to which the subscriber line is connected is stored in this field. Likewise, if other parameters are needed to describe the connection to the switch, they are stored in this field.

The next field is entitled CABLE CONNECTIONS. This field stores information about devices connected to subscriber line in the cable. For example, load coils are sometimes connected to subscriber lines. Where this information is known and available, it is stored in this field.

The next field is entitled INSTALL PARAMETERS. At the time a subscriber line is placed in service, some telephone companies measure various parameters of the line. For example, line capacitance is sometimes measured. When this information is known and available, it is entered into the cable database. This information is used similarly to the information in the footprint database. Namely, it highlights changes in the line from when the line was known to be in an operating condition.

The last field in the record is entitled C.O. LIMITS. The length of wiring within a central office between a switch and a cable leaving the central office can vary greatly from central office to central office. Each central office has C.O. limits which define the maximum length of these wires. This information is used, as in current systems, to aid in locating faults within the central office. It is also used, as described below, to select the width of pulses used for MTDR measurements.

CONSTRUCTION AND UPDATE OF EXPERT SYSTEMS

Knowledge based analysis 260 involves three types of expert systems as shown in FIG. 3A. Of those three experts, only one, rule based classifier 310 is fully programmed before TSC 132 operates. Both case based classifier 312 and tree based classifier 314 are built from historical data about failures. For case based classifier 312, the historical database is processed into a case base. For the tree based classifier, the historical database is processed into the tree as described above.

The case base is made by selecting only certain records in the historical failure data base. The selected records are only those in which the dispatch field do not match the close out field, i.e. exceptions. The selected records are further processed to group the individual exceptions into generalized categories. One way to perform this generalization is to use a rule based expert system which is programmed with rules about generalizing from records in the historical failure database.

For example, the expert system might be programmed with rules that specify grouping all records that have the same values in their RULES TRIGGERED, DISPATCH and CLOSE OUT fields. Further rules might specify that these groups be segmented into subgroups based on similarity of the values in the various fields of the records selected. Further, the rules might specify that no exception be entered into the case base unless there are at least three entries in the subgroup. The actual record entered into the case base might have fields representing a range of values. The range in each field would be equal to the average of the values in that field of the records in the subgroup, plus or minus two standard deviations. Other rules might prohibit entries into the case base when the standard deviations of many fields are too large.

The tree needed to construct tree based classifier 314 is also constructed from the historical failures data base. The above described commercially available IND software builds a probability tree based on statistical techniques. That software determines the probability, based on historical information, of the failure being located in a specific segment of the network given that certain parameters fall within specified ranges. The parameters which the IND software uses to build the tree can be specified in advance by an human expert using intuition and experience. The parameters selected could be the same as those stored in the fields of the records in the historical failure data base. Preferably, not all of the fields in the historical failure data base will be used to reduce the processing times.

Additionally, the parameters used to construct the probability tree could be derived by combining several of the parameters in the records in the historical data base. For example, it has been observed that the difference between the tip to ground susceptance and the ring to ground susceptance is more useful in segmenting failures than using those two numbers separately. Using parameters which are derived from other parameters allows for classifications based on relative values. For example, one parameter used in the decision tree might be the percentage change in the capacitance of the line relative to the capacitance of the line measured at the time of installation.

In addition to the specific parameters which are used to build the probability tree, the ranges of those parameters must be specified. Again, that information can be specified in advance by a human expert. For example, the ring to ground resistance might be segmented into three ranges: 0 to 1 KΩ, 1K to 1 MΩ and greater than 1 MΩ. These classifications could be based on the generalization that a resistance of less than 1 KΩ is characteristic of a short in the cable, a resistance of 1K to 1 MΩ is characteristic of a short or cross in the cable or drop and a resistance greater than 1 MΩ represents a normal operating range.

The selection of parameters to build the tree as well as the ranges could be specified in advance. Alternatively, the parameters and their ranges could be selected based on the effectiveness of a previously constructed tree in classifying historical failure data from a set of test cases.

Using software which constructs both the case base and the decision tree based on the historical data allows the diagnosis of faults to become more accurate the longer the system operates. Software which constructs the case base and the decision tree could be included in TSC 132. Alternatively, it could be installed on a computer at some remote site. If the software is on a remote computer, the case base and the decision tree must be downloaded into TSC 132.

The software which constructs the case base and the decision tree is also preferably used to update the case base and the decision tree on a periodic basis. Each could be updated as a new record is added to the historical failure data base. To reduce the amount of computing time needed for updates, though, it might be preferable to only perform the updates once a month or at some other periodic interval.

The specific expert systems depicted in FIG. 3A allow for the rapid construction of an expert system without a large amount of up front programming. The accuracy of the system is improved because it corrects itself as it operates. To the extent rules for segmenting faults are known in advance, they may be programmed into rule based classifier 310. However, if some rule is omitted or not known to the rule developer, tree based classifier 314 is likely to discover it. Conversely, if a rule is incorrectly programmed into rule based classifier 310, case based classifier 312 is likely to discover that that rule results in many exceptions and will effectively cancel out the incorrectly programmed rule.

It might, however, still be desirable to update the software or rules performing knowledge based analysis 260. This updating can be performed when desired. The outputs of the various classifiers shown in FIG. 3A are well suited for making these adjustments. For example, if case based classifier 312 shows a rule produces many exceptions, that rule might be removed. As another example, if tree based classifier 314 produces numerous probability vectors which have very low probabilities associated with them, that indicates that the parameters or ranges used to construct the branches of the probability tree associated with those vectors are not very useful in identifying fault locations. Those parameters might then be eliminated from the probability tree or the ranges changed.

As described above, the rules are programmed into rule based classifier 310 initially. Those rules codify expert knowledge. As systems which segment faults to either the central office, cable or station are known, the bulk of all knowledge needed to write the rules in rule based classifier 310 is known. The knowledge must simply be expressed in the IF THEN format accepted by the commercially available software implementing rule based classifier 310.

New rules are needed to employ new measurement techniques of the invention. Rules for the preferred embodiment are given in the tables below. Table I shows rules programmed into footprint analyzer 350. Table II shows rules programmed into trouble history analyzer 354. Table III shows rules programmed into black spot analyzer 352 and Table IV shows rules programmed into rule based classifier 356. The first column in each table shows the IF portion needed to trigger the rule. The second column in each table shows the conclusion when the IF part is satisfied. The third column lists the certainty factor associated with the conclusion. It should be appreciated, though, that numerous alternative or additional rules might be used.

TABLE I

FOOTPRINT ANALYSIS RULES

| IF | THEN | CRT |
|---|---|---|
| The EQUIPMENT NUMBER of a line as obtained from the CABLE DATA BASE differes from that in the FOOTPRINT DATA BASE | Indicate that the FOOTPRINT DATA can not be used for fault classification | 1.0 |
| The TIME STAMP is older than a out-of-date period | Indicate that the FOOTPRINT DATA can not be used for fault classification | 1.0 |
| The CABLE DATA BASE indicates that the equipment for a line has | Indicate that the FOOTPRINT DATA can not be used for fault classification | 1.0 |

TABLE I-continued

FOOTPRINT ANALYSIS RULES

| IF | THEN | CRT |
|---|---|---|
| been reassigned after the TIME STAMP in the FOOTPRINT DATA BASE | | |
| The portions of the current AC model related to the cable differs from the cable related component of the AC model in the FOOTPRINT DATA BASE by less than the measurement error; and The portions of the current AC model related to the termination differs from the termination related component of the AC model in the FOOTPRINT DATA BASE by more than the measurement error | Indicate that the termination related portion of the AC model in the FOOTPRINT DATA BASE can not be used for fault classification; and Indicate that the cable related portion of the AC model in the FOOTPRINT DATA BASE can be used for fault classification | 0.85 |
| The current AC model of the line differs from the AC model in the FOOTPRINT DATA BASE by less than the measurement error; and the current DC model of the line differs from the DC model in the FOOTPRINT DATA BASE by less than the measurement error | Indicate that the FOOTPRINT DATA can be used for fault classification | 0.85 |

TABLE II

TROUBLE HISTORY ANALYSIS RULES

| IF | THEN | CRT |
|---|---|---|
| The most recent closed out trouble report in HISTORICAL FAILURE DATA BASE for the line is older than an out-of-date time | Indicate that the stored trouble history cannot be used for fault classification | 1.0 |
| The most recent closed out trouble report for the line was Fault-Premise; and The most recent closed out trouble report is no older than two days old | Indicate a history of Fault-Premise | 0.75 |
| The most recent closed out trouble report for the line was Fault-Network; and The most recent closed out trouble report is no older than two days old | Indicate a history of Fault-Network | 0.75 |
| A line has more than one closed out trouble report; and The last closed out trouble occurred no longer than 15 days ago; and the last closed out trouble report was Fault-Premise; and At least 75% of the closed out trouble reports for the last 15 days were Fault-Premise | Indicate a history of Fault-Premise | 0.70 |

TABLE II-continued

TROUBLE HISTORY ANALYSIS RULES

| IF | THEN | CRT |
|---|---|---|
| A line has more than one closed out trouble report; and The earliest closed out trouble report occurrred no longer than 15 days ago; and The lase closed out trouble was Fault-Network; and at least 75% of the closed out troubles for the last 15 days were Fault-Network | Indicate a history of fault-Network | 0.75 |

TABLE III

BLACKSPOT ANALYSIS RULES

| IF | THEN | CRT |
|---|---|---|
| A line is served by cables with no sections having resistance faults harder than 1M Ω; and The worst resistive fault is a short less than 10K Ω; and There are no other resistive faults on the line | Indicate a Fault-Premise | 0.80 |
| A line is served by cables with no sections having resistive faults harder than 1M Ω; and The line has a resistive fault harder than 20K Ω | Indicate a Fault-Network | 0.75 |

TABLE IV

FAULT SEGMENTATION RULES

| IF | THEN | CRT |
|---|---|---|
| A hazardous DC potential has been detected on the line | Indicate a Fault-Network | 1.0 |
| No cable was detected based on parameters in AC model; and No customer premise equipment was detected; and No central office battery was detected | Indicate a Fault-Network | 0.95 |
| The worst resistive fault is a ground less than or equal to the central office ground resistance limit | Indicate a Fault-Network | 0.90 |
| The worst resistive fault is a cross less than or equal to the central office cross resistance limit | Indicate a Fault-Network | 0.80 |
| The worst resistive fault is a short less than or equal to the | Indicate a Fault-Network | 0.80 |

TABLE IV-continued

FAULT SEGMENTATION RULES

| IF | THEN | CRT |
|---|---|---|
| central office short resistance limit The worst resistive fault is a cross greater than the central office cross resistance but less than the hard resistive fault limit | Indicate a Fault-Network | 0.75 |
| The worst resistive fault is a ground and is greater than the central office ground resistance limit but less than the hard resistive fault limit; and Another resistive fault is a cross equal to or less than the central office cross resistance limit | Indicate a fault-Network | 0.75 |
| The worst resistive fault is a short and is greater than the central office short resistance limit but less than the hard resistance fault limit; and another resistive fault is a cross equal to or less than the central office cross resistance limit | Indicate a Fault-Network | 0.85 |
| The worst resistive fault is a short greater than the central office short resistance limit but less than the hard resistive fault limit; and no other resistive fault is a cross equal to or less than the central office cross resistance limit | Indicate a Fault-Premise | 0.75 |
| The tip to ground and ring to ground capacitances in the AC model differ by more than 20%; and No high impedance ringer was detected; and The AC model shows a high impedance between tip and ring | Indicate a Fault-Network | 0.90 |
| A high noise level with the frequency of a power line has been detected | Indicate a Fault-Network | 0.70 |
| No termination has been detected; and The tip to ground and ring to ground capacitances in the AC model are equivalent; and The reference data in the FOOTPRINT DATA BASE can be used; and the cable length of the line is no more than 100 feet shorter than the cable derived from the reference data | Indicate a Fault-Premise | 0.85 |
| No termination has been detected; and The tip to ground and ring to ground capacitances in the AC model are equivalent; and The reference data in the FOOTPRINT DATA BASE can be used; and the cable length of the line is more than 100 feet shorter than the cable derived from the reference data | Indicate a Fault-Network | 0.85 |
| A termination has been detected; and No other faults are detected; and No history of Fault-Premises is indicated; and No history of Fault-Network is indicated | Indicate Test-OK | 0.85 |
| No termination has been detected; and The stored reference in the FOOTPRINT DATA BASE can be used; and Comparison of MTDR trace to stored reference MTDR trace shows no signature of a network interface device | Indicate Fault-Network | 0.85 |
| No termination has been detected; and the stored reference in the FOOTPRINT DATA BASE can be used; and Comparison of MTDR trace to stored reference MTDR trace shows a signature of a network interface device | Indicate a Fault-Premise | 0.85 |
| A cross or ground or short resistive fault has been detected; and MTDR trace shows a wet line signature | Indicate a Fault-Network | 0.70 |
| A cross resistive fault has been detected; and The voltage of the cross is greater than 120V AC | Indicate a Fault-Network | 0.80 |
| A cross resistive fault has been detected; and The voltage of the cross is less than 120V AC | Indicate a Fault-Premises | 0.80 |
| A ground resistive fault has been detected; and MTDR measurement indicates a sheath ground | Indicate a Fault-Network | 0.95 |
| A ground resistive fault has been detected; and The resistance of the fault is less than one half of the loop resistance plus 250 Ω | Indicate a Fault-Network | 0.80 |
| A short resistive fault has been detected; and The stored reference data in the FOOTPRINT DATA BASE can be used for fault classification; and Comparison of MTDR trace to stored reference MTDR trace shows a signature | Indicate a Fault-Premise | 0.85 |

TABLE IV-continued

FAULT SEGMENTATION RULES

| IF | THEN | CRT |
|---|---|---|
| of a network interface device A short resistive fault has been detected; and The stored reference data in the FOOTPRINT DATA BASE can be used for fault classification; and Comparison of MTDR trace to stored reference MTDR trace shows no signature of a network interface device | Indicate a Fault-Network | 0.85 |

MEASUREMENT TECHNIQUES

As described above, the hardware and methods used to measure parameters and detect an open, short, cross, ground or noise are all well known. Numerous techniques to perform these functions are incorporated into commercially available test and measurement equipment. Likewise, techniques to determine whether a receiver is off hook, such as is employed at decision block 224, are also included in commercially available equipment.

The technique to determine whether a subscriber line has a high impedance termination has not heretofore been included in automatic telephone line test equipment. A traditional technique for measuring the presence of ringers has been to apply a low voltage AC signal to the telephone line. The applied voltage is of sufficient magnitude to cause a current to flow through the ringer, but is not large enough to cause the phone to ring. By measuring the current, the number of ringers on the phone line can be computed.

This approach is not suitable for detecting solid state ringers or other high impedance terminations. Such devices have a zener diode or other nonlinear voltage blocking element in series with the line. The zener diode does not conduct unless the applied voltage exceeds a threshold voltage. Accordingly, testing for a ringer with a low voltage will produce no current flow and a false indication that no ringer is present.

At decision block 218, the presence of a high impedance ringer is detected by measuring the charging current under two different conditions. In the first condition, the applied voltage is insufficient to turn on a zener diode. In the second case, the applied voltage is sufficient to turn on a zener diode. In each case, however, the applied voltage signal is preferably shaped such that it does not actually cause a phone connected to the line to ring. Pulses with rise times in the range of 10 to 100 milliseconds are preferred.

The voltage of the first pulse is chosen to be slightly less than the voltage used for the conventional ringer detection tests. Here 7.7V is selected, but the exact value is not critical to the invention. The current flow induced by this voltage is integrated. The integration time is preferably selected to reject noise generated by power lines and other periodic sources. In the US, an integration time which is an integer multiple of 1/30 of a second is preferred while in Europe an integer multiple of 1/25 of a second is preferred. The integrated current represents the charge stored in the telephone line.

The voltage of the second pulse is provided by the central office battery signal or some other convenient high voltage. The current is again integrated for the same period of time. The integrated current represents the charge stored in the telephone line plus the charge stored in the ringer.

Since a telephone line is largely a linear device, its capacitance is constant regardless of the applied voltage level. The charged stored in the line in response to the larger voltage should be proportional to the charge stored in response to the smaller voltage. The proportionality factor is the ratio of the larger voltage to the smaller voltage.

Any difference in charge measured with the larger voltage over this proportional amount represents charge used to charge up the inherent capacitance of the ringer once the zener diode was turned on. This charge yields an indication of the capacitance and size the zener diodes of all the high impedance ringers connected to the telephone line. If the computed capacitance is in the range expected for one or more high impedance ringers, a high impedance ringer is determined to be connected to the line. By dividing the computed capacitance by the average capacitance of a high impedance ringer, the total number of high impedance ringers may be calculated as well.

The measurements needed to determine the number of high impedance ringers are all of the type which may be made by a conventional remote measurement unit. The calculations needed to determine whether high impedance ringers are present are also easily programmed on the computer within TSC 132.

A second measurement technique not used in currently available test equipment is the high impedance measurement performed at step 240 (FIG. 2). This technique utilizes hardware such as is in commercially available line test equipment. Computations, which can be readily programmed in TSC 132, are performed on that data. The result of those computations is the line resistance from the central office to the location of the short or cross. As line resistance is proportional to wire length, this measured value is a useful indication of the distance from the central office to the fault. When compared to the length of the line indicated by the stored reference footprint, this value is very useful in locating the fault.

Figure 6:
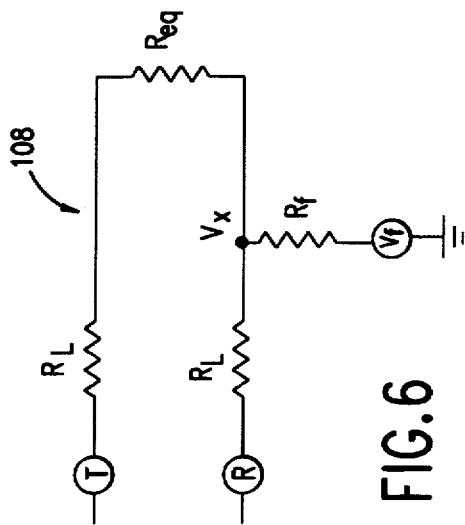
FIG. 6 is an schematic of a faulty telephone line useful in understanding high impedance measurement techniques according to the invention.

FIG. 6 is a sketch of a subscriber line 108 made up of a tip (T) and ring (R) wires. A short or cross fault is represented as a voltage $V_f$ connected through some resistance Rf to the ring line. It will be appreciated though, that the same analysis will apply if the fault is on the tip side of the line. The resistance of each wire between the central office and the fault is represented as $R_L$. The resistance between the fault and the end of the line, including the off hook resistance of the subscriber equipment or other resistive line termination, is depicted as $R_{eq}$.

The first measurement made is to measure the voltage between the tip and ring lines. The next measurement is made by driving a voltage on the ring line and measuring the voltage on the tip line. This measured voltage can be represented as $V_{r1}$. The third measurement is made by driving a voltage on the ring line and measuring the voltage on the ring line. This measured voltage can be represented as $V_{r2}$.

The first measured voltage tells the value of $V_f$. Assuming the source used to drive the voltage has an internal resistance of $R_s$ and internal voltage of $V_d$, the third measurement tells the current through the ring line. Using these measurements, Ohm's Law may be used to compute the resistance of the fault and the line resistance to the fault. The line resistance $R_L$ is given by the expression $R_s(V_{r1}-V_{r2})/(V_{r2}-V_d)$. The fault resistance $R_f$ is given by the expression $R_s(V_f-V_{r1})/(V_{r2}-V_d)$.

The foregoing calculations assume that the voltage meter used to make the measurements had no affect on the voltage on the line. Voltmeters are made to have very high impedances so that they will not load down the the circuits which they are measuring. In some instances, such as when the fault resistance is very high, it may be desirable to compensate mathematically for the loading effect of the meter.

The compensation is made by making at least two measurements of the voltage. One is made with the volt meter alone. The second measurement is made with a resistor in parallel with the volt meter. If the internal resistance of the voltmeter is known, the two measurements can be used to compute the drop in the measured voltage caused by current flow into the meter. This drop can then be added to the measured voltage to arrive at the voltage a meter which did not load the circuit would indicate.

MTDR is also a known technique. Equipment which makes MTDR measurements and data which can be derived from MTDR measurements is also known. These things are described, for example, in a paper entitled *Time Domain Reflectometry: versatile new way of testing cable*, by John Trudel, published in TELEPHONY Jan. 19, 1976, which is hereby incorporated by reference. That paper describes how certain faults make characteristic patterns. For example, the tip or ring lines shorted to sheath ground produces a negative going pulse whereas water in a cable produces a pair of pulses with opposite polarities. Step 246 is programmed to recognize these patterns.

Because MTDR measurements in the invention are being made by hardware connected to a switch rather than directly to a cable, certain measurement parameters must be selected appropriately. The pulse used for the MTDR measurement has an amplitude preferably in the range of 10 to 20 Volts and a duration preferably in the range of 2 nsec to 1 μsec. The largest amplitude which does not harm devices on the network should be used. The pulse should have the narrowest duration possible to provide greater resolution. There are two limitations on how narrow the pulse can be. First, narrow pulses contain less energy than wide pulses and do not provide useful signals on long telephone lines. Second, the path between remote measurement unit 120 and cable 110 contains numerous connections within central office 102. These connections represent discontinuities which could cause the pulse to be prematurely reflected. To avoid this, the pulse should be of sufficient duration that the voltage source within measurement unit 126 still be driving the line when the leading edge of the pulse reaches cable 110, i.e. the pulse width must exceed the propagation time from measurement hardware 126 to cable 110. The propagation time is proportional to the wiring length. The maximum allowable length of wiring within a central office is specified by a telephone company as C.O. limits and is thus available for use by TSC 132 and remote measurement unit 120.

To determine the pulse width to be used for a particular line, remote measurement unit 120 sets the pulse width to the minimum possible based on the C.O. limits. Then, it takes a series of measurements at successively longer pulse widths. For each measurement, it observes whether the longer pulse produced reflections occurring at a later time than occurred with a narrower pulse. The narrowest pulse which produced the latest reflected pulse is selected as the pulse width to use for measurements on the selected subscriber line. The pulse parameters used to make the first measurement are then stored as part of the footprint for that line and are used for all subsequent measurements on that line.

Having described a preferred embodiment of the invention, various alternative embodiments might be constructed. For example, various decision blocks were included in FIG. 2 to avoid measuring with an MTDR when it would not provide useful information. These decision blocks were provided to reduce, on average, the total time needed to isolate a fault. The system would work equally well, though slightly slower, without them.

Also, preliminary analysis 214 was described to be identical to analysis used in commercially available products. Other types of analysis could be used. For example, expert system software could be used. Additionally, the preliminary analysis is shown to be separate from the knowledge based analysis. These functions need not be separated. Knowledge based analysis software as shown in FIG. 3A could equally well be programmed with rules to perform the preliminary analysis functions.

Further testing could be added to the testing described above. For example, FIG. 2 shows a step 290 at which trend analysis is performed. It is possible that symptoms of a developing problem might appear on a telephone line before the problem is severe enough to be termed a fault. Once TSC 132 is configured to store data about the operating parameters of the telephone line at various times, it is possible to use that data to detect a trend leading to a fault.

For example, step 290 could examine the tip to ring resistance in the DC model of the line taken over time. If the data showed the resistance was initially 10 MΩ but decreased over a period of two months to 4 MΩ, this trend might indicate a developing short between tip and ring. This information could be used to schedule a service call on the line. Alternatively, the information might be saved until a fault interfering with service developed. Then, this information might be used to aid localizing of the fault. In that instance, knowledge based analysis 260 would include rules relating present faults to historical trends detected at step 290.

The data used to detect trends at step 290 might be the full set of parameters measured at step 212. Alternatively, many telephone companies perform a small set of measurements on each line frequently, such as every day. These "routine" measurements might be used for trend analysis.

Alternatively, various functions were described to be performed by expert system software. Expert systems are preferred because the software which controls program execution during the decision making process is commercially available. The expert systems are customized for the problem of fault segmentation by providing them rules and data on the specific problem. It should be appreciated, though, that a computer could be programmed to make the same decisions without using commercially available expert system software. Virtually all programming languages contain constructs which allow conditional branching. Any of these languages could be used to write programs which produce a classification of various input parameters.

The measurement described for decision block 218 was described to be made with a DC voltage pulse. The pulse could be alternatively an ac signal having a ramped amplitude. As another alternative, the pulse could be an AC signal amplitude modulated with a sin(x)/x function. These alternative waveforms could reduce "bell tap". Bell tap is the audible tapping of a telephone ringer when tested.

In the preferred embodiment, all of the data analysis was described as being performed by TSC 132. Remote measurement unit 120 also contains a computer which could be programmed to perform some of the analysis. In fact, it is not necessary that there be a separate test system controller. Control of the measurement hardware provided by CPU 122 and the analysis provided by TSC 132 could all be performed on one computer.

Alternatively, more than two computers could be used. It was described that several expert systems executed on a single work station in TSC 132. Each expert system could be programmed to run on a separate computer. Various methods of networking the computers together would be apparent to one of skill in the art.

Also, it was described that the remote measurement unit was located in a central office. It could be physically located at any cite. Preferably, it will be located in some facility containing switching equipment. Examples of alternative cites are host digital terminals, digital line concentrators and optical network units.

It was described above that MTDR measurements were made between the tip and ring leads of each subscriber line. It would also be possible to make MTDR or other measurements between leads of the line and the cable sheath. These measurements would assist in locating shorts to the cable sheath. To make the measurements, though, access hardware 124 would have to be modified to connect the MTDR component of measurement hardware 126 to the sheath. If these measurements are made, instead of storing one MTDR trace for each subscriber line, multiple traces would need to be stored.

Multiple MTDR traces might also be stored for one subscriber line for other reasons. For example, the multiple traces could represent measurements made at different times.

Further, it was described that the high impedance measurements performed at step 240 are useful for detecting certain single faults. The same techniques are also useful in detecting certain multiple fault conditions. For example, that technique can be used to detect a line suffering from both a short and a ground fault.

Also, it was described that DC measurements were represented as a DC model made up of five resistances. The same information may be equivalently represented by a DC model having three resistances and two voltage sources. Likewise, it was described that measurements were made of resistances and impedances. All such measurements could equivalently be expressed as conductances or admittances.

Further, the preferred embodiment of the invention was described as a system for testing metallic subscriber lines in a telephone network. The same techniques could be equally applied to other types of telephone lines. Slight changes in measurement hardware might be needed for other types of lines. For example, to test fiber optic lines, optical time domain reflectometry would be used in place of MTDR. Alternatively, they could be applied to other types of networks. For example, they could be applied to a local area network in an office building connecting numerous computers and computer peripherals together. The techniques described herein would be particularly applicable to the testing of coaxial cable networks.

Therefore, the invention should be limited only by the spirit and scope of the appended claims.

What is claimed is:

1. Apparatus for segmenting faults in the physical transport media of a telecommunications network having a plurality of lines, comprising:
   a) means for measuring a plurality of electrical parameters characterizing a selected line;
   b) memory means, connected to the means for measuring, for storing a plurality of electrical parameters characterizing the selected line at a first time; and
   c) means, connected to the memory means and the means for measuring, for comparing the stored parameters to parameters measured on the selected line at a second time, and for determining the location of a fault in said telecommunications network based on the change in the parameters before a repair person is dispatched to repair the fault.

2. The apparatus of claim 1 wherein the network comprises a telephone network and each of the lines comprises a plurality of subscriber lines terminating in premises wiring and the means for determining the location of a fault distinguishes between faults in the premises wiring and faults in other parts of said telecommunications network.

3. The apparatus of claim 2 wherein the first time is a time when the subscriber line is free of faults.

4. The apparatus of claim 3 wherein the stored parameters include a time domain reflectometry trace.

5. The apparatus of claim 3 wherein the telephone network includes a central office and the means for measuring comprises a measurement unit located within the central office.

6. The apparatus of claim 5 wherein the telephone network includes a technical service center and the memory means comprises nonvolatile memory connected to a computer in the technical service center.

7. Apparatus for segmenting faults in the physical transport media of a telecommunications network having a plurality of lines, comprising:
   a) means for measuring a plurality of electrical parameters characterizing a selected line;
   b) memory means, connected to the means for measuring, for storing a plurality of electrical parameters characterizing the selected line at a first time;
   c) means, connected to the memory means and the means for measuring, for comparing the stored parameters to parameters measured on the selected line at a second time and determining the location of a fault in said telecommunications network based on the change in the parameters;
   d) wherein the network comprises a telephone network and each of the lines comprises a plurality of subscriber lines terminating in premises wiring and the means for determining the location of a fault distinguishes between faults in the premises wiring and faults in other parts of said telecommunications network;
   e) wherein the means for determining the locations of a fault comprises a computer programmed with:
      i) a plurality of expert systems, each of which has an output representing a prediction of the location of a fault;
      ii) a means for selecting a fault location based on the outputs of the plurality of expert systems.

8. The apparatus of claim 7 wherein the plurality of expert systems comprises:
   a) a rule based expert system programmed with rules defining fault locations based on measured parameters; and
   b) a case based classification expert system programmed with a database representing cases which are exceptions to the rules.

9. The apparatus of claim 8 wherein the plurality of expert systems additionally comprises a tree based classification system programmed with a tree of conditional probabilities, each conditional probability being the probability that the fault is within a predetermined section of said telecommunications network given the values of the measured parameters.

10. Apparatus for segmenting faults in a network having a plurality of lines, each line having at least a pair of wires, comprising:

a) means for measuring parameters characterizing a selected line;

b) memory means, connected to the means for measuring, for storing parameters characterizing the selected line at a first time;

c) means, connected to the memory means and the means for measuring, for comparing the stored parameters to parameters measured on the selected line at a second time and determining the location of a fault in the network based on the change in the parameters; and d) wherein said means for measuring comprising:
   i) measurement hardware having at least two terminals and a control input, comprising:
      A) means for generating a voltage pulse at the two terminals in response to a control signal at the control input;
      B) means for recording a reflected signal at the two terminals;
   ii) access means, having a control input, for connecting the two terminals of the measurement hardware to a selected one of the plurality of lines through the switch in response to a control signal at the control input; and
   iii) a computer processor having control lines connected to the control inputs of the measurement hardware and the access means.

11. The apparatus for segmenting faults of claim 10 wherein the measurement hardware additionally comprises means for controlling the width of the voltage pulse in response to the electrical distance from the measurement hardware through the switch to the selected line and the length of the selected line.

12. Apparatus for segmenting faults in the physical transport media of a telecommunications network having a plurality of lines, comprising:

a) means for measuring a plurality of electrical parameters characterizing a selected line:

b) memory means, connected to the means for measuring, for storing a plurality of electrical parameters characterizing the selected line at a first time;

c) means, connected to the memory means and the means for measuring, for comprising the stored parameters to parameters measured on the selected line at a second time and determining the location of a fault in said telecommunications network based on the change in the parameters d) wherein the means for comparing the stored parameters to parameters measured on the selected line at a second time and determining the location of a fault in the network based on the change in the parameters comprises an expert system of the type constructed from a plurality of expert subsystems each providing inputs to an arbitrating expert and having at least two of the expert subsystems operate on different paradigms.

13. The expert system of claim 12 wherein one of the plurality of expert subsystems operates on a rule based reasoning paradigm.

14. The expert system of claim 13 wherein one of the plurality of expert subsystems operates on a case based reasoning paradigm.

15. An automatic test system for segmenting faults in a telephone network, the network including a plurality of cables, each of said cables carrying a plurality of subscriber loop lines, each subscriber loop line having a plurality of segments including at least a cable segment within the cable and a premises wiring segment outside the cable, the automatic test system comprising:

a) means for measuring parameters of the subscriber loop lines;

b) memory for storing representations of measured parameters of a plurality of subscriber lines;

c) control means, coupled to the measuring means and the memory, for:
   i) at a first time, initiating measurement of parameters of a plurality of the subscriber lines and for controlling the memory means to store representations of the measured parameters, and
   ii) at a second time, initiating measurements of a selected subscriber line and comparing selected stored representations to the measurements and indicating, based at least in part on the comparison, a prediction of a fault and the segment of said plurality of segments in which the fault occurs.

16. The automatic test system of claim 15 wherein said telephone network comprises a plurality of switching stations, the test system additionally comprising:

a) a plurality of measurement units each connected to said telephone network through a switching station;

b) a test system controller; and c) wherein the plurality of measurement units contain the means for measuring and the test system controller contains the control means.

17. The automatic test system of claim 16 wherein each of the measurement units comprises means for measuring voltage, current and impedance on a selected subscriber loop line.

18. The automatic test system of claim 16 wherein the test system controller additionally comprises a means for storing in the memory an indication of said first time.

19. The automatic test system of claim 16 wherein one of the measured parameters is an indication of the type of equipment connected to subscriber loop line.

20. The automatic test system of claim 16 additionally including a database storing records of predictions of faults in conjunction with an indication of the actual fault condition and segment of the fault.

21. The automatic test system of claim 16 additionally including means for replacing the stored representation of parameters of a subscriber line with representations of parameters measured at a third time.

* * * * *